US012405727B2

(12) United States Patent
Stewart et al.

(10) Patent No.: US 12,405,727 B2
(45) Date of Patent: Sep. 2, 2025

(54) METHOD AND APPARATUS FOR DATA BUFFERING OF WRITE OPERATIONS AND PERFORMING WRITE OPERATIONS

(71) Applicant: Intel Corporation, Santa Clara, CA (US)

(72) Inventors: Lawrence Stewart, Wayland, MA (US); David Keppel, Mountain View, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/344,901

(22) Filed: Jun. 30, 2023

(65) Prior Publication Data

US 2024/0126440 A1 Apr. 18, 2024

(51) Int. Cl.
*G06F 3/06* (2006.01)

(52) U.S. Cl.
CPC ............ *G06F 3/061* (2013.01); *G06F 3/0659* (2013.01); *G06F 3/0673* (2013.01)

(58) Field of Classification Search
CPC ...... G06F 3/061; G06F 3/0659; G06F 3/0673; G06F 2209/521; G06F 2209/548; G06F 3/0656; G06F 9/52; G06F 9/544; G06F 9/546
See application file for complete search history.

(56) References Cited

U.S. PATENT DOCUMENTS

| 11,481,147 | B1* | 10/2022 | Fradkin | G06F 3/0604 |
|---|---|---|---|---|
| 2011/0191555 | A1* | 8/2011 | Narayanan | G06F 3/065 |
| | | | | 711/E12.001 |
| 2015/0349926 | A1* | 12/2015 | Pollack | H04L 1/1874 |
| | | | | 714/749 |
| 2016/0202722 | A1* | 7/2016 | Kuwata | H04J 14/00 |
| | | | | 713/501 |
| 2018/0081624 | A1* | 3/2018 | Liljedahl | G06F 13/1673 |
| 2020/0073584 | A1* | 3/2020 | Tsuchiya | G06F 3/067 |
| 2022/0137873 | A1* | 5/2022 | Liljedahl | G06F 3/0656 |
| | | | | 711/154 |

(Continued)

OTHER PUBLICATIONS

Yang et al.; A Wait-free Queue as Fast as Fetch-and-Add; Department of Computer Science, Rice University; Mar. 12-16, 2016, Barcelona, Spain.

(Continued)

*Primary Examiner* — Tasnima Matin
(74) *Attorney, Agent, or Firm* — 2SPL Patent Attorneys PartG mbB; Yong Beom Hwang

(57) ABSTRACT

Various examples relate to a method, apparatus, device and computer program for a first entity, to a method, apparatus, device and computer program for a second entity, to the first and second entity, and to a system comprising the first and second entity. Some aspects of the present disclosure relate to a method for a first entity for data buffering of write operations performed by a second entity comprises providing a limited-space data buffer comprising a plurality of slots for storing data provided by the second entity, processing the data stored in the slots of the limited-space data buffer, updating a read indicator based on the processing of the data, and providing a copy of the read indicator to the second entity according to a pre-defined criterion.

20 Claims, 14 Drawing Sheets

(56) References Cited

U.S. PATENT DOCUMENTS

2023/0291696 A1* 9/2023 Ma .................. H04L 49/9031

OTHER PUBLICATIONS

Morrison et al; Fast Concurrent Queues for x86 Processors; Blavatnik School of Computer Science, Tel Aviv University; Feb. 23-27, 2013, Shenzhen, China.
Snellman, J., Juho Snellman's Weblog, "I've been writing ring buffers wrong all these years", https://www.snellman.net/blog/archive/2016-12-13-ring-buffers/ (posted on Dec. 13, 2016, last accessed: Jul. 18, 2023).
Morton, A., "RE: [RFC, 2.6] a simple FIFO implementation", https://lkml.iu.edu/hypermail/linux/kernel/0409.1/2709.html, (posted on: Sep. 15, 2004, last accessed: Jul. 18, 2023).
Torvalds, Linus, https://github.com/torvalds/linux/blob/1da177e4c3f41524e886b7f1b8a0c1fc7321cac2/drivers/net/lance.c (posted on: Apr. 17, 2005, last accessed: Jul. 18, 2023).
Herlihy Maurice, Shavit Nir, "The Art of Multiprocessor Programming", Morgan Kaufmann, (2012), ISBN: 9780124159501.

* cited by examiner

```
GPURing::Send(RingMessage *msg)
{
  unsigned my_ticket = atomic_next_send.fetch_add(1);   // allocate slot
  RingMessage *mp = &(sendbuf[my_ticket % RingN]);      // ring ptr
  RingMessage rm = *msg;     // load message into register
  rm.sequence = my_ticket;   // set sequence number // wait for previous uses of the buffer to be complete
  while ((my_ticket - peer_next_receive) > RingN) {
    memory_fence();
  } store64(mp, rm.data);      // send message, could be OOO
  memory_fence();
}
```

Fig. 10

```
void GPURing::Receive()
{
  int32_t my_ticket = atomic_next_receive.fetch_add(1); // allocate slot
  RingMessage *mp = &(recvbuf[my_ticket % RingN]);      // ring ptr
  RingMessage rm;
  do {
    memory_fence();
    rm.data = read64(mp);
  } while (rm.msg.sequence != my_ticket);

// Message removed from ring buffer, okay for sender to re-use slot
  if ((my_ticket & 0x7f) == 0) {          // 0x7f -> every 128
    GPU_STORE_PEER_NEXT_RECV(my_ticket);  // update transmit end
  }

ProcessMessage(&rm);
}
```

Fig. 11

```
void CPURing::Poll()
{
  unsigned lockwasbusy = atomic_receive_lock.exchange(1);
  if (lockwasbusy)
    return;     // another thread is already handling receive RingMessage msg = recvbuf[next_receive % RingN]; // load message
  boolean valid = false;
  if (msg.sequence == next_receive) {
    valid = true;
    next_receive = next_receive + 1;
    if ((next_receive & 0x7f) == 0)
       STORE_PEER_NEXT_RECV(next_receive);
  }
  atomic_receive_lock.store(0);  // release lock if (valid) ProcessMessage(&msg);
}
```

Fig. 12

```
void GPURing::PollMultiple()
{
  // round-robin assign threads to tracks:
  unsigned my_track = atomic_next_track.fetch_add(1) % TrackN;

// can this thread receive for this track?
  unsigned lockwasbusy = track[my_track].atomic_lock.exchange(1); // try track lock
  if (lockwasbusy) return;

// where to look for the next message
  unsigned my_slot = track[my_track].next_receive;  // this track's current receive
slot
  struct RingMessage *msgp = &recvbuf[my_slot % RingN]; // compute msg ptr for my_slot
  memory_fence();

// Is the next message ready?
  union RingMessages rm;
  rm.data = load64(msgp);  // load tentative message
  bool valid_msg = false;
  if (rm.msg.sequence != my_slot) {
    goto out;
  }
  valid_msg = true;
  // Received a message, where to look for next message
  track[my_track].next_receive = my_slot + TrackN;  // next expected message slot // Update per-group counter
  unsigned my_group = groupof(my_slot);
  unsigned next_group_base = roundup(my_slot);  // seq. number starting <next> group
  unsigned my_max = groups[my_group].atomic_credit.fetch_add(1)

// If group has not received all messages, then done
  if (my_max + 1 < next_group_base)
    goto out;

// Group has received all messages, tell the sender.
  // If the next group's messages all received, then repeat.
  for (;;) {
    GPU_STORE_PEER_NEXT_RECV(my_max);
    unsigned updateN = RingN - MsgsPerGroup;
    my_max = groups[my_group].atomic_credit.fetch_add(updateN)
    next_group_base += MsgsPerGroup;
    if (my_max + 1 < next_group_base)
      goto out;
  } out:
  track[my_track].atomic_lock.store(0)    // release the lock
  if (valid_msg) ProcessMessage(&rm.msg); // deal with received message
}
```

```cpp
void GPURing::PollMultiple()
{
    unsigned my_track = atomic_next_track.fetch_add(1) % TrackN;  // round robin assign threads to tracks
    unsigned lockwasbusy = track[my_track].atomic_lock.exchange(1);  // try track lock
    union RingMessages rm;
    if (lockwasbusy == 0) {  // we got the lock
        unsigned my_slot = track[my_track].next_receive;  // current receive slot for this track
        struct RingMessage *msgp = &recvbuf[my_slot % RingN];  // compute msg ptr for my_slot
        syci::atomic_fence(syci::memory_order::seq_cst, syci::memory_scope::system);
        rm.data = ucl_ulong8((ulong8 *) msgp);  // load tentative message into registers
        if (rm.msg.sequence == my_slot) {  // has the expected message actually arrived?
            ProcessMessage(&rm,msg);  // deal with received message
            track[my_track].next_receive = my_slot + TrackN;  // compute next expected message slot
            unsigned my_group = groupof(my_slot);  // the message we got is in my_group
            /* perhaps reduce contention on atomic_credit_group by first accumulating
               in the track counter */
            unsigned next_group_base = roundup(my_slot);  // sequence number of beginning of the <next> group
            unsigned add_in = 1;  // at first, we count only the message received
            for (;;) {
                // a group is finished when its count is the sequence number of the base of the <next> group
                if (groups[my_group].atomic_credit.fetch_add(add_in) == (next_group_base - add_in)) {
                    // inform sender of progress once per group
                    GPU_STORE_PEER_NEXT_RECV(next_group_base)
                    my_group = (my_group + 1) % GroupN;
                    add_in = RingN - MsgsPerGroup;  // set up to carry-in to the following group
                    next_group_base += MsgsPerGroup;  // the amount to carry to next
                                                      // to be used if the next group is finished
                } else {
                    break;  // This message does not end the group
                }
            }
        }
        track[my_track].atomic_lock.store(0);  // release track lock
    } // else lockwasbusy!=0, the track was already locked
}
```

METHOD AND APPARATUS FOR DATA BUFFERING OF WRITE OPERATIONS AND PERFORMING WRITE OPERATIONS

BACKGROUND

In computer architecture, there are some scenarios where writers on one device wish to enqueue messages to readers on a different device. The memory of the respective other device may be accessed remotely, but remote operations, and in particular remote reads, are much more expensive (with respect to latency, bandwidth and/or repeat rate) than local operations. Asymmetric memory arises, for example, in communications between a CPU (Central Processing Unit) and a GPU (Graphics Processing Unit) across a PCIexpress (Peripheral Component Interconnect express) bus.

BRIEF DESCRIPTION OF THE FIGURES

Some examples of apparatuses and/or methods will be described in the following by way of example only, and with reference to the accompanying figures, in which:

FIG. 10 shows a pseudocode of an example of a GPU transmit subroutine;

FIG. 11 shows a pseudocode of an example of the GPU receive subroutine;

FIG. 12 shows a pseudocode of an example of a CPU receive polling subroutine;

FIGS. 15a and 15b show pseudocode of two examples of a GPU PollMultiple subroutine.

DETAILED DESCRIPTION

Figure 1A:
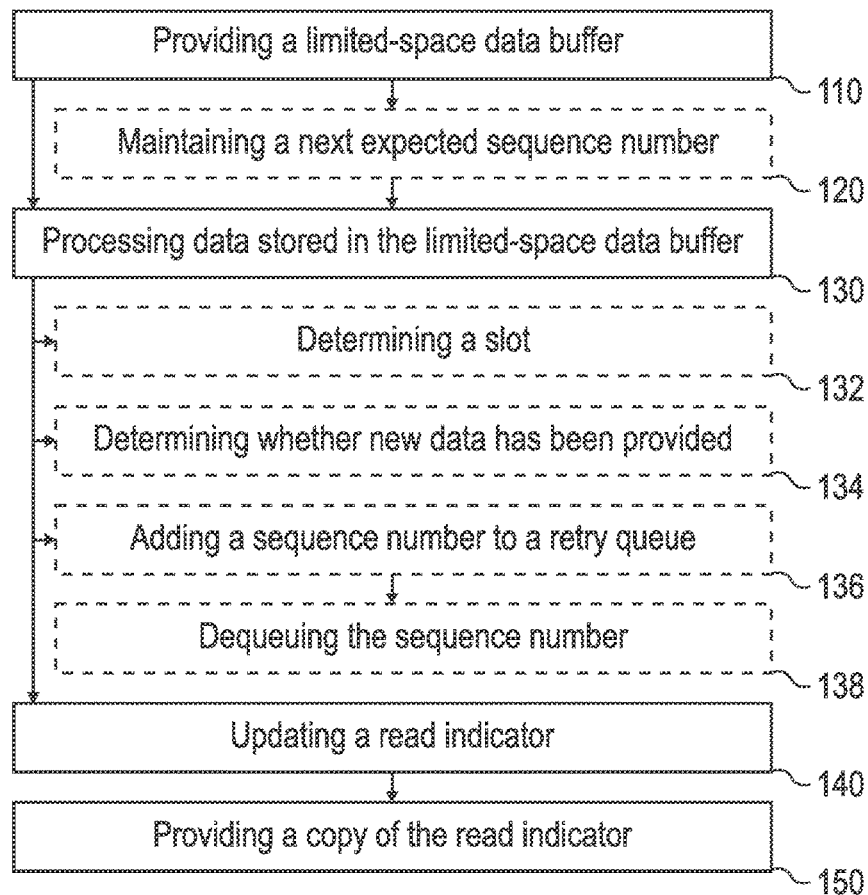
FIG. 1a shows a flow chart of an example of a method for a first entity for data buffering of write operations performed by a second entity.

Some examples are now described in more detail with reference to the enclosed figures. However, other possible examples are not limited to the features of these embodiments described in detail. Other examples may include modifications of the features as well as equivalents and alternatives to the features. Furthermore, the terminology used herein to describe certain examples should not be restrictive of further possible examples.

Throughout the description of the figures same or similar reference numerals refer to same or similar elements and/or features, which may be identical or implemented in a modified form while providing the same or a similar function. The thickness of lines, layers and/or areas in the figures may also be exaggerated for clarification.

When two elements A and B are combined using an "or", this is to be understood as disclosing all possible combinations, i.e. only A, only B as well as A and B, unless expressly defined otherwise in the individual case. As an alternative wording for the same combinations, "at least one of A and B" or "A and/or B" may be used. This applies equivalently to combinations of more than two elements.

If a singular form, such as "a", "an" and "the" is used and the use of only a single element is not defined as mandatory either explicitly or implicitly, further examples may also use several elements to implement the same function. If a function is described below as implemented using multiple elements, further examples may implement the same function using a single element or a single processing entity. It is further understood that the terms "include", "including", "comprise" and/or "comprising", when used, describe the presence of the specified features, integers, steps, operations, processes, elements, components and/or a group thereof, but do not exclude the presence or addition of one or more other features, integers, steps, operations, processes, elements, components and/or a group thereof.

In the following description, specific details are set forth, but examples of the technologies described herein may be practiced without these specific details. Well-known circuits, structures, and techniques have not been shown in detail to avoid obscuring an understanding of this description. "An example/example," "various examples/examples," "some examples/examples," and the like may include features, structures, or characteristics, but not every example necessarily includes the particular features, structures, or characteristics.

Some examples may have some, all, or none of the features described for other examples. "First," "second," "third," and the like describe a common element and indicate different instances of like elements being referred to. Such adjectives do not imply element item so described must be in a given sequence, either temporally or spatially, in ranking, or any other manner. "Connected" may indicate elements are in direct physical or electrical contact with each other and "coupled" may indicate elements co-operate or interact with each other, but they may or may not be in direct physical or electrical contact.

As used herein, the terms "operating", "executing", or "running" as they pertain to software or firmware in relation to a system, device, platform, or resource are used interchangeably and can refer to software or firmware stored in one or more computer-readable storage media accessible by the system, device, platform, or resource, even though the instructions contained in the software or firmware are not actively being executed by the system, device, platform, or resource.

The description may use the phrases "in an example/example," "in examples/examples," "in some examples/examples," and/or "in various examples/examples," each of which may refer to one or more of the same or different examples. Furthermore, the terms "comprising," "including," "having," and the like, as used with respect to examples of the present disclosure, are synonymous.

Various examples of the present disclosure relate to a concept for a limited space-buffer, such as a ring buffer, for asymmetric memory. Various examples may provide a multithreaded first in first out queue data structure for situations where memory access times are asymmetric for the writers and readers.

There are a number of known data structures that can be used to implement queues. Queues can be categorized into bounded vs unbounded, multi-reader vs single-reader, multi-writer vs single writer, locking vs lock-free queues. Ring buffers are a nice implementation for bounded, single reader, single writer, lock-free queues, and can be extended for multi-threaded use by locking or more complex lock-free designs. Some approaches use shared control variables to implement multi-threaded use, which can lead to poor performance in the presence of asymmetric memory access times. When used in coherent shared memory systems, shared control variables may also lead to cache line ping-pong.

In some scenarios, writers on one device wish to enqueue messages to readers on a different device. The memory on the remote device may be remotely accessed, but remote operations are often much more time-expensive than local operations. Asymmetric memory arises, for example, in communications between CPU and GPU across a PCIexpress bus.

Various examples of the present disclosure relate to a queuing mechanism for asymmetric memory scenarios. This queuing mechanism may provide increased performance of messaging runtime software and possibly increased power efficiency.

Moreover, remote memory often is not shared memory and might not be coherent. In the proposed design, shared control variables might not be used, and only remote writes might be used, avoiding remote reads. The proposed concept may be offered in library form for general use, or as part of an implementation of a communication middleware.

Figure 1B:
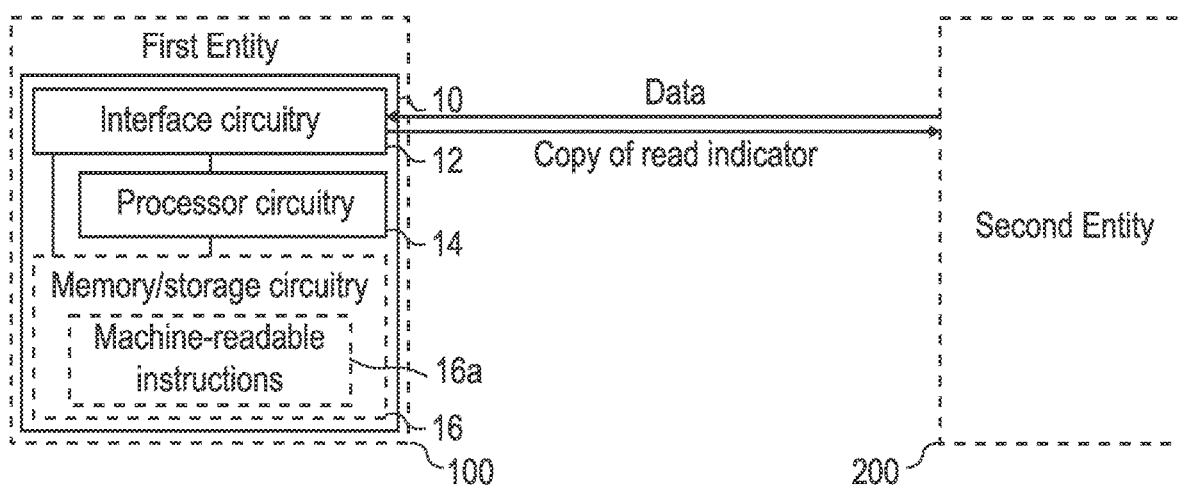
FIG. 1b shows a schematic diagram of an example of an apparatus or device for a first entity for data buffering of write operations performed by a second entity, of a first entity comprising such an apparatus or device, and of a system.

In the following, two methods and corresponding apparatuses, devices and computer programs are introduced, which may be used to implement a queuing mechanism. In FIGS. 1a to 1b, the receiving mechanism is represented (at a first entity where data is written into a buffer), while FIGS. 2a to 2b represent the sending mechanism (at a second entity, which writes the data to the buffer at the first entity).

Figure 2A:
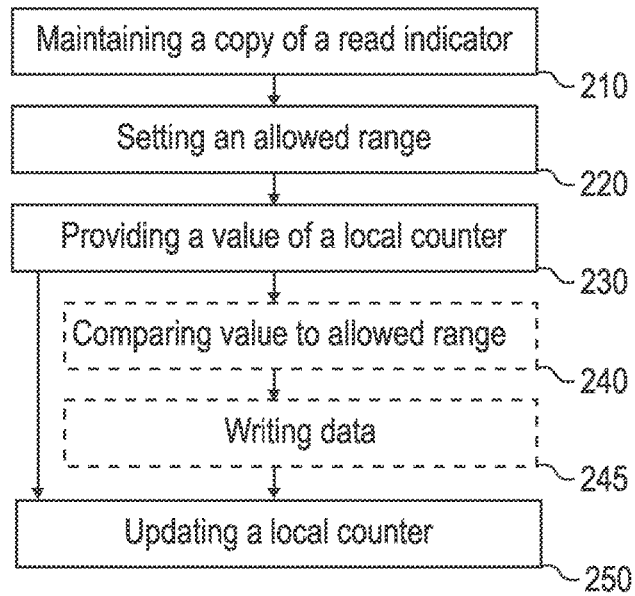
FIG. 2a shows a flow chart of an example of a method for a second entity for performing write operations at a first entity.
Figure 2B:
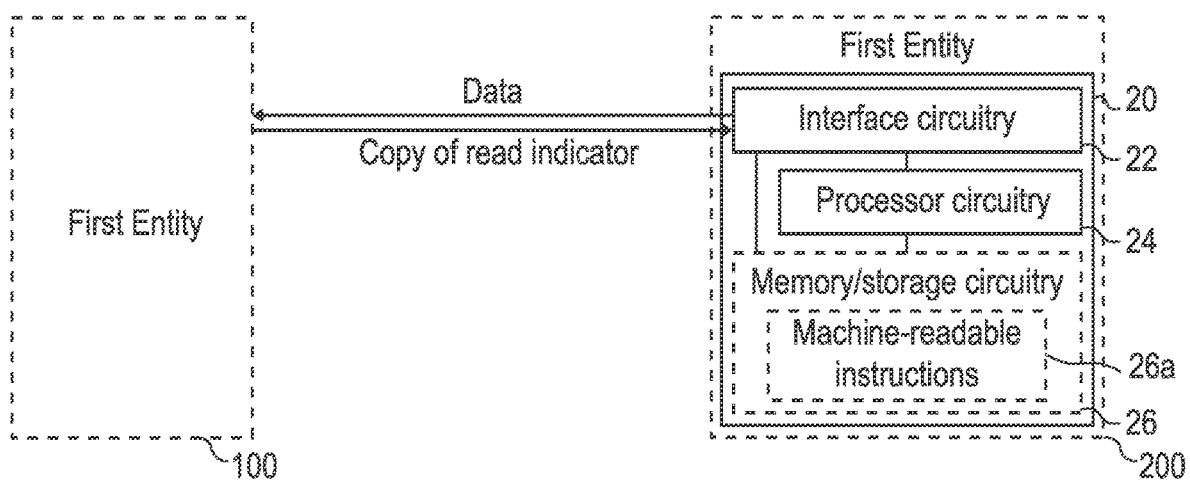
FIG. 2b shows a schematic diagram of an example of an apparatus or device for a second entity for performing write operations at a first entity, of a second entity comprising such an apparatus or device, and of a system.

FIG. 1a shows a flow chart of an example of a method for a first entity 100 (shown in FIG. 1b) for data buffering of write operations performed by a second entity 200 (also shown in FIG. 1b, and discussed in more detail with respect to FIGS. 2a and 2b). The method comprises providing 110 a limited-space data buffer (e.g., a limited-size data buffer) comprising a plurality of slots for storing data provided by the second entity. The method comprises processing 130 the data stored in the slots of the limited-space data buffer. The method comprises updating 140 a read indicator based on the processing of the data. The method comprises providing 150 a copy of the read indicator to the second entity according to a pre-defined criterion. For example, the method may be performed by the first entity 100, e.g., by an apparatus 10 or device 10 (shown in FIG. 1b) of the first entity 100.

FIG. 1b shows a schematic diagram of an example of an apparatus 10 or device 10 for the first entity for data buffering of write operations performed by a second entity. The apparatus 10 comprises circuitry to provide the functionality of the apparatus 10. For example, the circuitry of the apparatus 10 may be configured to provide the functionality of the apparatus 10. For example, the apparatus 10 of FIG. 1b comprises interface circuitry 12, processor circuitry 14, (optional) memory/storage circuitry 16. For example, the processor circuitry 14 may be coupled with the interface circuitry 12, with the memory/storage circuitry 16. For example, the processor circuitry 14 may provide the functionality of the apparatus, in conjunction with the interface circuitry 12 (for communicating with the second entity, e.g., via a computer network, such as Ethernet or a fiber-based communication network, or via a computer bus, such as PCIexpress), and the memory/storage circuitry 16 (for storing information, such as machine-readable instructions, and/or for providing the space-limited data buffer). In other words, the space-limited data buffer may be stored in the memory or storage circuitry 16. Likewise, the device 10 may comprise means for providing the functionality of the device 10. For example, the means may be configured to provide the functionality of the device 10. The components of the device 10 are defined as component means, which may correspond to, or implemented by, the respective structural components of the apparatus 10. For example, the device 10 of FIG. 1b comprises means for processing 14, which may correspond to or be implemented by the processor circuitry 14, means for communicating 12, which may correspond to or be implemented by the interface circuitry 12, (optional) means for storing information 16, which may correspond to or be implemented by the memory or storage circuitry 16. In general, the functionality of the processor circuitry 14 or means for processing 14 may be implemented by the processor circuitry 14 or means for processing 14 executing machine-readable instructions. Accordingly, any feature ascribed to the processor circuitry 14 or means for processing 14 may be defined by one or more instructions of a plurality of machine-readable instructions. The apparatus 10 or device 10 may comprise the machine-readable instructions 16a, e.g., within the memory or storage circuitry 16 or means for storing information 16, as shown in FIG. 1b.

FIG. 1b further shows the first entity 100 comprising the apparatus 10 or device 10. In some examples, the first entity 100 and the second entity 200 may both be computer systems that are interconnected via a computer network (e.g., via the interface circuitry 12 or means for communicating 12. Alternatively, one of the first entity 100 and the second entity 200 may be a Central Processing Unit (CPU) of a computer system, and the respective other entity may be an accelerator (card), such as a Graphics Processing Unit (GPU), machine-learning accelerator or Field-Programmable Gate Array (FPGA) included in (or coupled with) the computer system, which are connected to each other via a bus, such as PCIexpress, of the computer system. FIG. 1b further shows a system comprising both the first entity 100 and the second entity 200, e.g., a system comprising two computer systems, or a computer system comprising a CPU and an accelerator. In general terms, the first entity 100 and the second entity 200 may be remote from each other, e.g., different components of the same computer system that do not communicate via (coherent) shared memory, or different computer systems.

More details of the method, a corresponding computer program, the apparatus 10, the device 10, the first entity 100 and the second entity 200 are given in connection with FIGS. 2a to 15b, with reference to the method of FIG. 1a. In connection with FIGS. 3 to 15b, the limited-space data buffer is a ring buffer that is used to implement a queue. In other words, the limited-space data buffer may be a ring buffer. A ring buffer, also known as a circular buffer, is a data structure that is used to store and manage a sequence of elements, usually of fixed size. The buffer is implemented as a fixed-size array or block of memory, where the total number of elements in the buffer (i.e., the ring size) is determined beforehand. However, the proposed concept is not limited to ring buffers, but can be applied to any limited-size buffers with a pre-defined number of slots for storing data.

Moreover, in connection with FIGS. 3 to 15b, it is, in many cases, assumed that the first entity is the CPU and the second entity is the GPU of a computer system (or vice versa), which are interconnected via a PCIexpress bus.

The interface circuitry 12 or means for communicating 12 may correspond to one or more inputs and/or outputs for receiving and/or transmitting information, which may be in digital (bit) values according to a specified code, within a module, between modules or between modules of different entities. For example, the interface circuitry 12 or means for communicating 12 may comprise circuitry configured to receive and/or transmit information.

For example, the processor circuitry 14 or means for processing 14 may be implemented using one or more processing units, one or more processing devices, any means for processing, such as a processor, a computer or a programmable hardware component being operable with accordingly adapted software. In other words, the described function of the processor circuitry 14 or means for processing may as well be implemented in software, which is then executed on one or more programmable hardware components. Such hardware components may comprise a general-purpose processor, a Digital Signal Processor (DSP), a micro-controller, etc.

For example, the memory or storage circuitry 16 or means for storing information 16 may a volatile memory, e.g., random access memory, such as dynamic random-access memory (DRAM), and/or comprise at least one element of the group of a computer readable storage medium, such as a magnetic or optical storage medium, e.g., a hard disk drive, a flash memory, Floppy-Disk, Random Access Memory (RAM), Programmable Read Only Memory (PROM), Erasable Programmable Read Only Memory (EPROM), an Electronically Erasable Programmable Read Only Memory (EEPROM), or a network storage. Within the memory or storage circuitry 16, the limited-space data buffer, as well as the read indicator and/or a next expected sequence number may be stored within volatile or non-volatile writeable memory or storage, such as random-access memory or flash storage. Preferably, the limited-space data buffer may be stored in volatile memory, such as random-access memory.

More details and aspects of the method, apparatus 10, device 10, computer program, first entity 100 and second entity 200 are mentioned in connection with the proposed concept, or one or more examples described above or below (e.g., FIG. 2a to 15b). The method, apparatus 10, device 10, computer program, first entity 100 and second entity 200 may comprise one or more additional optional features corresponding to one or more aspects of the proposed concept, or one or more examples described above or below.

FIG. 2a shows a flow chart of an example of a method for a second entity 200 for performing write operations at a first entity 100. The method comprises maintaining 210 a copy of a read indicator provided by the first entity as a local variable, the copy of the read indicator indicating one or more slots of a plurality of slots of a limited-space data buffer having been processed at the first entity. For example, the copy of the read indicator may be written to a memory (or storage) of the second entity by the first entity. The method comprises setting 220 an allowed range for a local counter based on the read indicator. The method comprises providing 230 a value of the local counter to an application waiting to perform a write operation at a first entity, with the write operation being constrained by the allowed range. The value of the local counter indicates a slot of the plurality of slots to perform the write operation at. For example, as the method may comprise comparing 240, by the application, whether the value of the local counter provided to the application is within the allowed range, and writing, by the application, data the 245 to a slot of the plurality of slots according to the value of the local counter if the value of the local counter is within the allowed range. The method comprises incrementing 250 the local counter. For example, the method may be performed by the second entity 200, e.g., by an apparatus 20 or device 20 (shown in FIG. 2b) of the second entity 200.

FIG. 2b shows a schematic diagram of an example of an apparatus 20 or device 20 for the second entity 200 for performing write operations at the first entity 200. The apparatus 20 comprises circuitry to provide the functionality of the apparatus 20. For example, the circuitry of the apparatus 20 may be configured to provide the functionality of the apparatus 20. For example, the apparatus 20 of FIG. 2b comprises interface circuitry 22, processor circuitry 24, (optional) memory/storage circuitry 26. For example, the processor circuitry 24 may be coupled with the interface circuitry 22, with the memory/storage circuitry 26. For example, the processor circuitry 24 may provide the functionality of the apparatus, in conjunction with the interface circuitry 22 (for communicating with the first entity, e.g., via a computer network, such as Ethernet or a fiber-based communication network, or via a computer bus, such as PCIexpress), and the memory/storage circuitry 26 (for storing information, such as machine-readable instructions). In other words, the space-limited data buffer may be stored in the memory or storage circuitry 26. Likewise, the device 20 may comprise means for providing the functionality of the device 20. For example, the means may be configured to provide the functionality of the device 20. The components of the device 20 are defined as component means, which may correspond to, or implemented by, the respective structural components of the apparatus 20. For example, the device 20 of FIG. 2b comprises means for processing 24, which may correspond to or be implemented by the processor circuitry 24, means for communicating 22, which may correspond to or be implemented by the interface circuitry 22, (optional) means for storing information 26, which may correspond to or be implemented by the memory or storage circuitry 26. In general, the functionality of the processor circuitry 24 or means for processing 24 may be implemented by the processor circuitry 24 or means for processing 24 executing machine-readable instructions. Accordingly, any feature ascribed to the processor circuitry 24 or means for processing 24 may be defined by one or more instructions of a plurality of machine-readable instructions. The apparatus 20 or device 20 may comprise the machine-readable instructions 26a, e.g., within the memory or storage circuitry 26 or means for storing information 26, as shown in FIG. 2b.

FIG. 2b further shows the second entity 200 comprising the apparatus 20 or device 20. FIG. 2b further shows a system comprising both the first entity 100 and the second entity 200, e.g., a system comprising two computer systems, or a computer system comprising a CPU and an accelerator.

In some examples, the first entity 100 and/or the second entity 200 may comprise both the apparatuses 10; 20 or devices 10; 20 of FIGS. 1*b* and 2*b*, and/or perform the methods of both FIGS. 1*a* and 2*a*. In other words, the proposed concept may be used for two-way communication (via limited-space buffers) between the two entities.

More details of the method, a corresponding computer program, the apparatus 20, the device 20, the first entity 100 and the second entity 200 are given in connection with FIGS. 1*a*, 1*b*, and 3 to 15*b*, with reference to the method of FIG. 2*a*.

The interface circuitry 22 or means for communicating 22 may correspond to one or more inputs and/or outputs for receiving and/or transmitting information, which may be in digital (bit) values according to a specified code, within a module, between modules or between modules of different entities. For example, the interface circuitry 22 or means for communicating 22 may comprise circuitry configured to receive and/or transmit information.

For example, the processor circuitry 24 or means for processing 24 may be implemented using one or more processing units, one or more processing devices, any means for processing, such as a processor, a computer or a programmable hardware component being operable with accordingly adapted software. In other words, the described function of the processor circuitry 24 or means for processing may as well be implemented in software, which is then executed on one or more programmable hardware components. Such hardware components may comprise a general-purpose processor, a Digital Signal Processor (DSP), a micro-controller, etc.

For example, the memory or storage circuitry 26 or means for storing information 26 may a volatile memory, e.g., random access memory, such as dynamic random-access memory (DRAM), and/or comprise at least one element of the group of a computer readable storage medium, such as a magnetic or optical storage medium, e.g., a hard disk drive, a flash memory, Floppy-Disk, Random Access Memory (RAM), Programmable Read Only Memory (PROM), Erasable Programmable Read Only Memory (EPROM), an Electronically Erasable Programmable Read Only Memory (EEPROM), or a network storage. Within the memory or storage circuitry 26, local variables, such as the copy of the read indicator or the local counter, may be stored within volatile or non-volatile writeable memory or storage, such as random-access memory or flash storage.

More details and aspects of the method, apparatus 20, device 20, computer program, first entity 100 and second entity 200 are mentioned in connection with the proposed concept, or one or more examples described above or below (e.g., FIG. 1*a* to 1*b*, 3 to 15*b*). The method, apparatus 20, device 20, computer program, first entity 100 and second entity 200 may comprise one or more additional optional features corresponding to one or more aspects of the proposed concept, or one or more examples described above or below.

Figure 3:
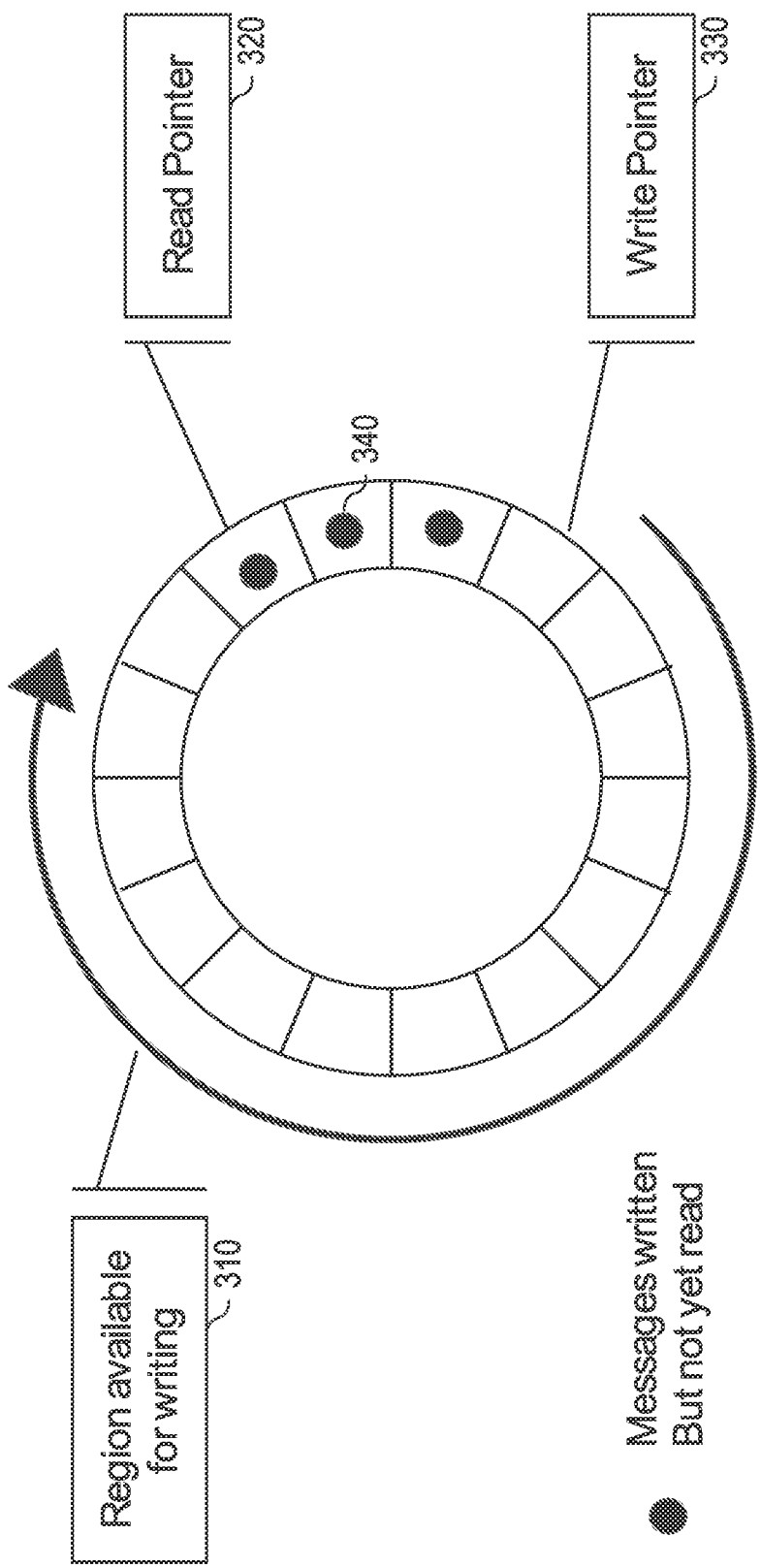
FIG. 3 shows a schematic diagram of a classic ring buffer design, using shared control variables.

There is a long history of ring buffer data structures for use as bounded queues between producers and consumers. There are many closed and open source libraries available as well as technical papers and book expositions. For example, Herlihy's "The Art of Multiprocessor Programming" devotes a chapter to the subject. FIG. 3 shows a schematic diagram of a classic ring buffer design, using shared control variables. FIG. 3 shows the cells of the ring buffer (forming a ring structure), with a region 310 available for writing that is determined by a read pointer 320 and a write pointer. The ring is empty when the read pointer and the write pointer point at the same cell. Between the read pointer and the write pointer, the cells contain messages 340 that have been written but not read.

However, implementations of ring buffers are generally designed for use in shared memory multiprocessors, in which memory is coherent and the producers and consumers have similar read and write access times to the data structure or simply accept that remote read and cache line ping-pong costs are an inevitable cost—and lose performance as a result.

In the proposed concept, the challenge of the writers (producers) and readers (consumers) of the queue being separated by a long latency communications channel, such as PCIexpress, on which writes and reads may have different performance characteristics, and where only some underlying memories may be coherent, may be addressed. This situation arises in several circumstances. For example, readers and writers may be on different computer systems, which use RDMA (remote direct memory access) to communicate. As another example, readers and writers may be on different systems, which use a PGAS (Partitioned Global Address Space) model to communicate. As another example, readers and writers may be on, for example, a CPU and a GPU, connected by a PCIexpress bus.

Lack of coherency may interfere with using some other ring buffer designs. For example, a lock may be used to allocate space. With coherency, the lock may be cached with a core doing several writes, and the lock cost is therefore small. Without coherency, the lock operation may need to be remote, so that every allocation request requires a (slow) remote lock/etc. operation.

In the following, it is assumed that each end has local memory, for which both reads and writes are fast. It is assumed that each end (i.e., each of the first entity and second entity of FIGS. 1*a* to 2*b*) can remotely access memory at the other end (i.e., the respective other entity), but that this is slower (than local memory access). In addition, remote reads may be especially slow, since one must wait for the answer, while remote writes may be fire-and-forget, and the system likely permits many outstanding remote writes. In other words, writes may be pipelined, but reads might not be. Multiple threads may be able to launch independent sequences of local or remote reads and writes. For these reasons, the proposed concept uses local reads and writes, but only remote writes.

For example, the proposed design may be used for parallel kernels running on a GPU (e.g., the second entity or the first entity) to send messages to software running on a host CPU (the respective other entity). As an additional requirement, since GPUs have very large numbers of threads often running in lockstep, a design capable of very high degrees of parallelism was implemented.

Figure 4:
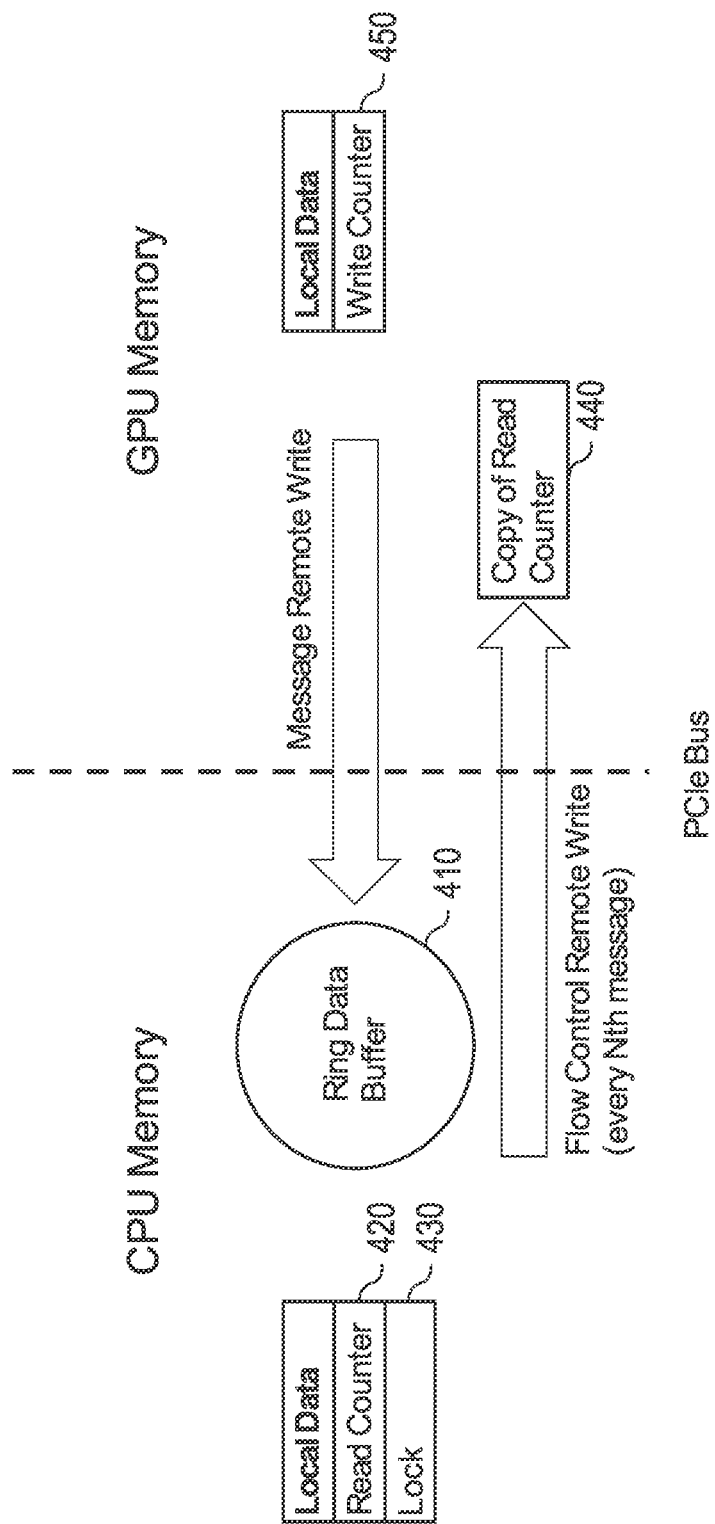
FIG. 4 shows a schematic diagram of a communication between a CPU and a GPU.

FIG. 4 shows a schematic diagram of a communication between a CPU and a GPU, with one direction of data flow shown. In this figure, threads on the GPU (on the right side) are sending data to the CPU (on the left). Data is placed in a circular buffer (a ring buffer) 410, which is an implementation of the limited-space data buffer referred to in connection with FIGS. 1*a* to 2*b*. Messages are sent by GPU write to the ring kept in CPU memory. These are remote write operations. Code on the GPU is responsible for arbitrating among multiple threads wishing to send messages, allocation of space in the ring, and delivery of messages. Code running on the CPU is responsible for receiving messages and for providing flow control information back to the GPU, to tell it when sections (i.e., the plurality of slots of the limited-space data buffer) of the ring can be reused. For this purpose, on the CPU side, as local data, a read counter 420 (i.e., the read indicator discussed in connection with FIGS. 1a to 1b) and a (optional) lock 430 are maintained. A copy 440 of the read counter 420 (i.e., the copy of the read indicator) is remotely written to the GPU memory as flow control (e.g., after every N-th message/write by the GPU side). The GPU maintains a write counter 450 (i.e., the local counter discussed in connection with FIGS. 2a and 2b) as local data. FIG. 4 shows one direction of data flow, from GPU to CPU, but a flipped copy of the same design, with caveats discussed below, works to deliver messages from CPU to GPU.

In a straightforward implementation, messages are a fixed size selected so that a message can be delivered by a single machine instruction, such as an uncached 64-byte store, from GPU to CPU, or by a single machine instruction such as MOVDIR64b from CPU to GPU. In other words, with respect to the methods of FIGS. 1a and 1b, the data stored in the slots of the limited-space data buffer may have a fixed size, e.g., a fixed size that can be delivered by a single machine instruction. These instructions may be atomic, which means that all bytes are delivered at once, provided the destination is aligned. In other words, as further shown in FIG. 2a, the method for the second entity may comprise, by the application, writing data 245 to a slot of the plurality of slots according to the local counter, e.g., using an atomic write operation. This is not essential, but very convenient. Alternatively, a non-atomic instruction may be used. In any case, the act of writing 245, by the application, is constrained by the allowed range, with the write operation being constrained by the allowed range, i.e., a write might only be performed, if the value of the local counter (i.e., sequence numbers) provided to the application is within the allowed range. For example, the method of FIG. 2a may comprise comparing 240, by the application, whether the value of the local counter provided to the application is within the allowed range, and writing data the 245 to a slot of the plurality of slots according to the value of the local counter if the value of the local counter is within the allowed range.

If the message and its associated header fields fit into a single atomic store, then only a single machine instruction is necessary for delivery. Current generation CPUs and GPUs offer 64-byte instructions, so this is a convenient size. If larger messages are needed, they can be transmitted in sections, provided that the section containing the sequence number is transmitted last. In any case, the actual payload data may be written to the slots of the limited-space data buffer/ring buffer. In other words, with respect to the methods of FIGS. 1a and 1b, the data stored in the slots of the limited-space data buffer may comprise payload data. If multiple writes are necessary to send a longer message, then a memory fence may be used before the final store to enforce ordering.

Messages in the ring can be variable length. One way to do this is to have the message header contain the length of the message. In other words, with respect to the methods of FIGS. 1a and 1b, the data stored in the slots of the limited-space data buffer may have a variable size, with the data comprising a header portion specifying a size of the data and a payload portion comprising payload data. However, this may introduce a data dependency between a message and the location of the following message. This can reduce the performance of multithreaded receive. In the case of GPU to CPU communications, a single receive thread may be sufficient, so this new dependency does not cause a performance drop. If the message data is outside the ring, then there is no constraint on the length of messages.

It is also possible to use shorter atomic writes and put the message data out of line. The message itself might only carry a reference or pointer to the message data. Accordingly, with respect to the methods of FIGS. 1a and 1b, the data stored in the slots of the limited-space data buffer may comprise a pointer to variable-size data provided by the second entity. With respect to the method of FIG. 1a, processing the data may comprise obtaining the variable-size data according to the pointer stored in the respective slot. For example, out of band data buffers may be used for messages of arbitrary size. In this case, a message can contain a reference or pointer to the actual message data, rather than the entire message. When this is done, the sender may use a memory fence after storing the message data outside the ring and before sending the message itself. Message data may be kept in memory at either end.

Figure 5:
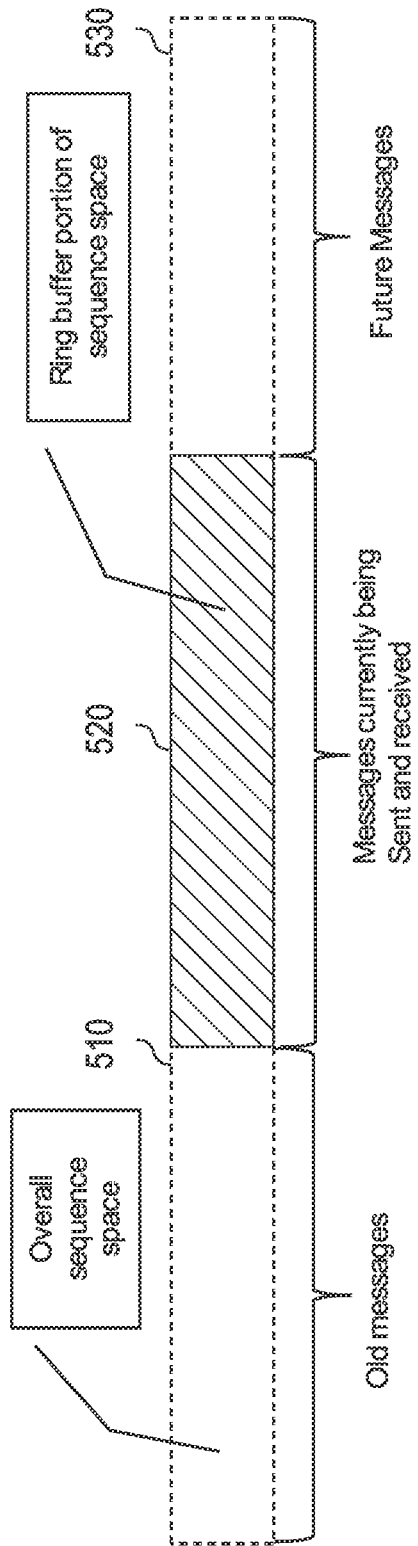
FIG. 5 shows a schematic diagram illustrating a ring buffer as a sliding window in a sequence number space.

In some examples of the proposed design, a circular, or ring buffer for storing messages is used (for implementing the limited-space data buffer), but the management of the ring is different. Moreover, the data structure being used is not limited to ring buffers. To make the explanation clear, FIG. 5 unrolls the ring so that it occupies a segment of a much longer sequence of past and future messages. FIG. 5 shows a schematic diagram illustrating a ring buffer as a sliding window in a sequence number space. FIG. 5 shows an overall sequence space, with a region 510 of old messages, a region 520 of messages currently being sent and received, which corresponds to the ring buffer portion of sequence space, and a region 530 for future messages. For example, with respect to the methods of FIGS. 1a and 1b, the limited-space data buffer may be segmented into a first segment of previously processed data, a second segment of data being processed or data to be processed, and a third segment for future data to be provided by the second entity, with the segmentation changing according to a progress in processing the data and according to the copy of the read indicator provided to the second entity. In particular, the segmentation may change according to sequence numbers used by the first and second entity for coordination. With this perspective, there is an indefinite sequence of sequentially numbered messages comprising the overall sequence space of messages. Old messages 510 are those which have been sent and received long since. Future messages 530 are those not yet sent. Between those are the messages 520 currently being sent and received, using the ring buffer as temporary storage.

Figure 6:
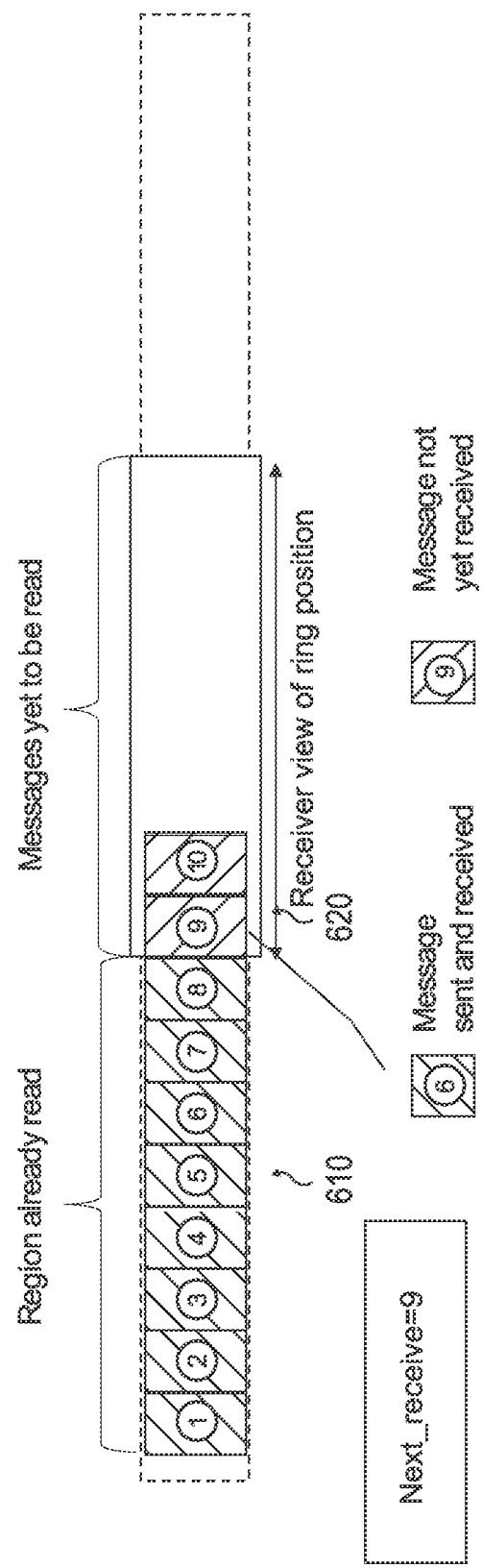
FIG. 6 shows a schematic diagram of a receiver's view of a ring buffer.

In the following, some relevant design elements of the proposed concept are discussed, starting with how the receiver works, using FIG. 6 as a reference. FIG. 6 shows a schematic diagram of the receiver's view of the ring buffer. FIG. 6 shows a region 610 of messages (i.e., data) already read, and a region 620 of messages yet to be read. From the receiver's point of view, messages appear in a buffer in sequential order (as indicated by the sequence numbers). The receiver may have a single control variable, next_receive (e.g., a next expected sequence number), which is the master sequence number of the next expected message. For example, as further shown in FIG. 1a, the method for the first entity may comprise maintaining 120 at least one next expected sequence number. Acts of determining whether new data has been provided in a slot and of processing the data may be based on the at least one next expected sequence number, for example. The receiver knows where (e.g., which slot of the limited-size buffer/ring buffer) this message (i.e., the data) will appear, but not when. The sequence number may map to a ring location by a modulo-N operation, and the receiver may watch the spot (i.e., the slot) where the message will eventually appear, until the contents of that location change to the expected sequence number. Accordingly, the data stored in the respective slots may comprise a sequence number. As further shown in FIG. 1a, the method for the first entity may comprise determining 134 whether new data has been provided in a slot based on the sequence number of the data stored in the slot. In the method for the first entity, the acts of determining whether new data has been provided in a slot and of processing the data may be based on a mapping between the respective sequence numbers and the plurality of slots, e.g., by mapping the sequence number to a ring location by a modulo-N operation.

Then the receiver may process the message and advance (i.e., increment) the next_receive sequence number, thereby updating 140 the read indicator based on the processing of the data. At any time, from the perspective of the receiver, the ring buffer in memory provides space for messages with sequence numbers from next_receive to next_receive+Ring Size (i.e., size of the limited-space buffer). The receive code may both read and write the next_receive variable, but this is a purely local memory location that may be cached. The ring buffer itself is local to the receiver, which only reads it. The sending code may perform remote writes to deliver messages to the buffer located at the receiver. The sending code does not read from the buffer and does not have access to the next_receive variable.

Figure 7:
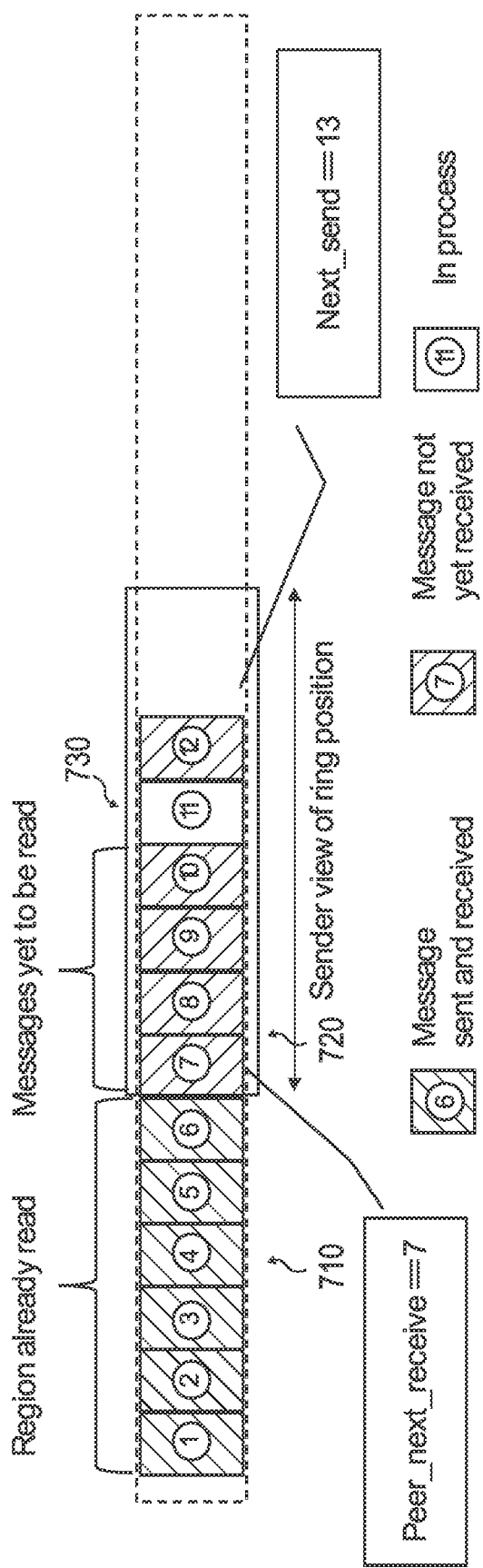
FIG. 7 shows a schematic diagram of a sender's view of a ring buffer.

FIG. 7 shows a schematic diagram of the sender's view of the ring buffer. In FIG. 7 a region 710 of already read messages containing messages sent and received, a region 720 of messages sent but not yet received, and a region 730 of messages in process are shown. From the sender's perspective, messages are written into the ring buffer (located at the receiver) in sequential order. The operation of the sender is controlled by two local variables. Next_send (i.e., the local counter at the second entity) contains the master transmit sequence number of the next message to send. Peer_next_receive (i.e., the copy of the read indicator) is the sequence number of the earliest message which is not known to have been received yet. In the sender's view, the ring buffer can hold messages with sequence numbers from peer_next_receive up to peer_next_receive+Ring Size (the size of the limited-space data buffer), resulting in the allowed range. In other words, the allowed range may be set based on the sequence number indicated by the copy of the read indicator and the size of the limited-spaced data buffer. A send sequence number may map to a location in the ring by a modulo N operation, such that the sender and receiver agree on where a particular message will go. The true value of next_receive is known only to the receiver. The receiver periodically sends a copy of next_receive by storing it remotely into peer_next_receive (located at the sender). For example, with respect to the method of FIG. 1a, the method may comprise providing the copy of the read indicator according to a pre-defined criterion, e.g., a pre-defined criterion that is based on the sequence numbers of the data processed at the first entity. For example, every k-th sequence number (with k being larger than 1, e.g., a fourth, an eight, a tenth or a sixteenth of the size of the limited space data buffer), a copy of the read indicator may be provided to the second entity (e.g., by writing the copy of the read indicator to memory at the second entity). Immediately after such an update, the sender and receiver agree on which sequence numbers are inside the ring, but between updates, the receiver continues to receive messages and advance next_receive, while the sender operates with old information (peer_next_receive). However, this lagging information is in a "safe" direction. The sender will never write more than RingSize messages ahead of peer_next_receive, but in fact it would be safe to write messages up to next_receive+Ring Size. In summary, with respect to the methods of FIGS. 1a and 1b, the read indicator and the copy of the read indicator indicate one or more slots of the plurality of slots as having been processed in terms of the sequence numbers included in the respective data having been processed. In effect, the copy of the read indicator may indicate the one or more slots of the plurality of slots having been processed in terms of sequence numbers included in the respective data having been processed by the first entity.

Figure 8:
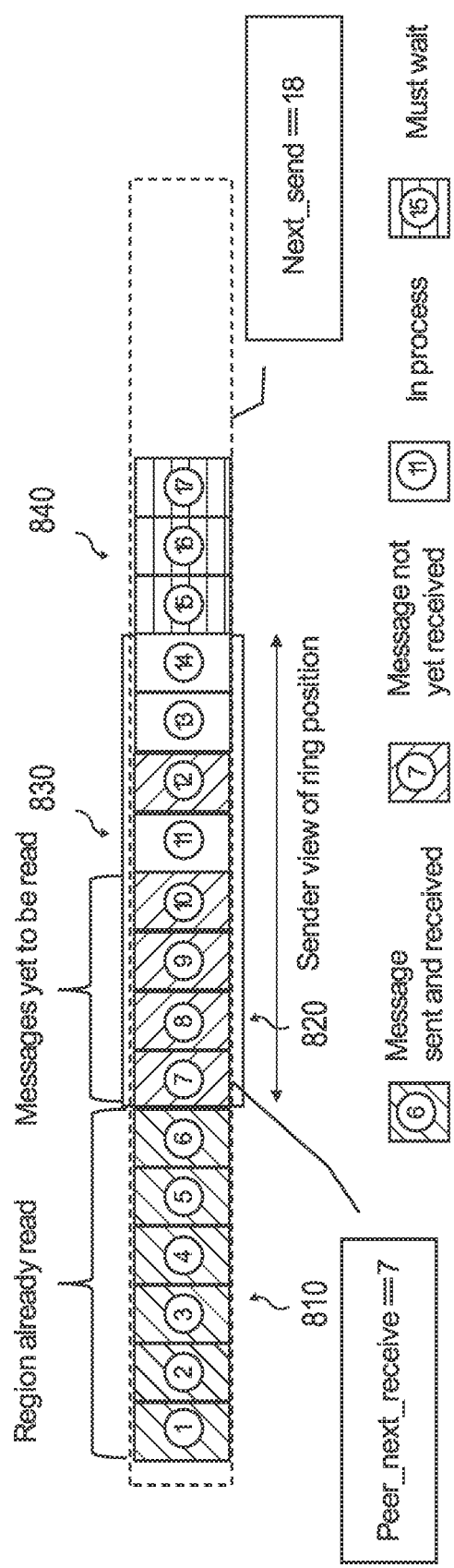
FIG. 8 shows a schematic diagram of a sender allocation of future messages.

FIG. 8 shows a schematic diagram of a sender allocation of future messages, showing how the sender determines when it is safe to send a message. Similar to FIG. 7, a region 810 of already read messages containing messages sent and received, a region 820 of messages sent but not yet received, and a region 830 of messages in process are shown. In addition, a region 840 of messages that must still wait is shown. Code running at the sender that wishes to send a message may first obtain a sequence number from next_send and may advance next_send. At first, these sequence numbers will be in the range from peer_next_receive to peer_next_receive+Ring Size (i.e., the allowed range set by the second entity). In FIG. 8, these sequence numbers are noted by regions 820 and 830, which represent messages which have been sent and those which are in the process of being sent. If the sender is getting ahead of the receiver, allocated sequence numbers will be too far in the future (i.e., outside the allowed range), and it is not safe to send them (indicated by region 840). For these, the sender waits until an update of peer_next_receive lets the sender know that enough messages have been received so that the newly allocated sequence numbers will fit into the ring. As a result, the local counter can be incremented 250 even beyond the allowed range, while the applications performing the write operations take into account the allowed range when performing the respective write operations.

Figure 9:
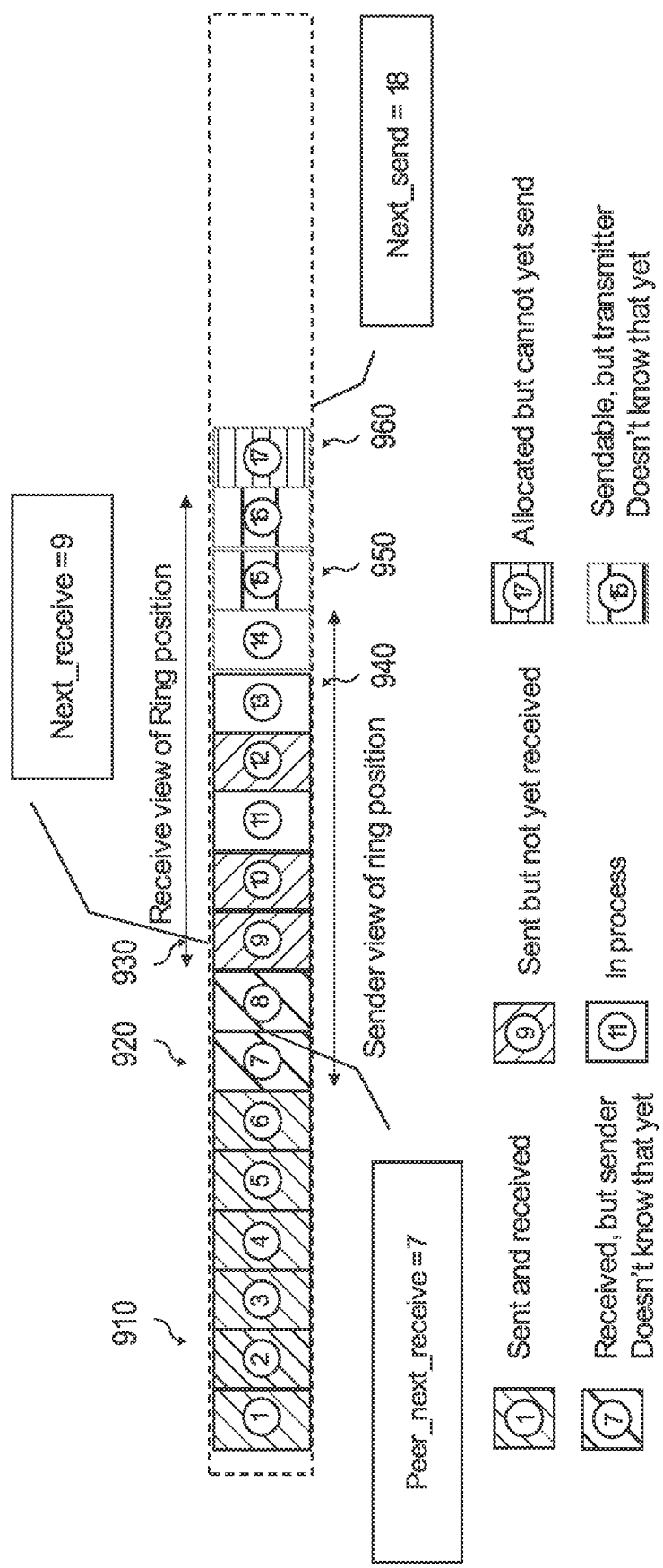
FIG. 9 shows a schematic diagram of a combined sender/receiver view of a ring buffer.

A combined view of the sender and receiver is shown in FIG. 9. FIG. 9 shows a schematic diagram of a combined sender/receiver view of the ring buffer. In FIG. 9, six regions are distinguished—a region 910 of messages that have been sent and received, a region 920 of messages that have been sent and received, but the sender does not know that they have been received, a region 930 of messages that have been sent but not received, a region 940 of messages that are ready to send, a region 950 of messages that are sendable, but the transmitted does not know that yet, and a region 960 of messages that are allocated but cannot send yet. In FIG. 9, past, current, and future messages are shown with different patterns to indicate their status as known by sender and receiver. The oldest messages 910, with the lowest sequence numbers, are known by both sender and receiver to have been successfully received. Then there is a segment 920 of sequence numbers, between peer_next_receive (known to the sender) and next_receive (known to the receiver), which have actually been received, but the sender doesn't know it yet. Following is the region of sequence number space starting at next_receive. In this region, there are messages 930 which have been sent, but which the receiver hasn't noticed yet. Later are messages 940 which are in the process of being sent, but which have not arrived in the ring buffer. There can be a fuzzy boundary between the sent but not received, and the in-process messages because when sending is done by multiple threads, they can get out of order. This is acceptable because the receiver looks for them in-order. This constraint is relaxed in some examples of the proposed concept. After sequence number peer_next_receive+Ring Size, there is a region 950 of sequence numbers which are actually inside the ring as known by the receiver. These could be transmitted but the sender doesn't know that yet. Finally, there is a region 960 of messages which have been allocated, but both receiver and sender would agree they cannot yet be sent because they are too far ahead to fit in the ring.

The above sequence of figures is drawn as though sending and receiving were done by single threads. In fact, both ends can be highly multithreaded. In the following, some design points are discussed which permit high degrees of multi-threading and which make very efficient use of the communications bus by delivering messages with single machine instructions.

In the following, arbitration is discussed. In many cases, a GPU environment runs many threads in parallel to execute code, called kernels, written in languages such as CUDA (a trademark of NVIDIA cooperation), SYCL (a trademark of the Khronos group) or DPC++ (Data Parallel C++). Sometimes, many threads attempt to send messages nearly simultaneously. Thus, the usual practice of locking to prevent multiple threads from executing a critical section of code can be a performance bottleneck. Contended locks (that is, when several threads request the lock at the same time) often have high overheads because the cache line holding lock state is moved between cores many times for each lock acquire and release. The atomic instructions for acquire and release may be one cycle each, but each line move can take hundreds of cycles.

Instead, in some examples, a style known as "lock free" is adopted, in which contending threads use atomic instructions to access a shared data structure. This can reduce the number of line moves—sometimes as low as one line move per acquire/release, even under contention. Some lock free approaches are also compatible with "cache atomics", where an atomics unit is added to a shared cache, eliminating line moves entirely.

Lock-free operation is generally harder to design than locking. One goal may be to allocate a space in the flow of messages for the use of each thread in an efficient way, e.g., as fast as possible. For example, a single fetch-and-add instruction may be used increment the sending sequence number. The single instruction may grant each thread a unique access ticket to the queue. In FIG. 7, the transmit threads may perform atomic fetch-and-add on the transmit control variable next_send. Thus, there may be many threads attempting to transmit messages and the only point of coordination is that they are each assigned unique sequential sequence numbers.

In the proposed concept, sending the messages (i.e., data) from the second entity to the first entity is performed by applications (e.g., GPU kernels) running on the respective entity. These applications (or application threads)/kernels are provided with the value of the local counter (i.e. next_send). The value of the local counter indicates a slot of the plurality of slots to perform the write operation at, and so the application (thread)/kernel knows where to write the data using remote memory access. In many cases, this local counter may represent a sequence number, which is to be included by the application waiting to perform the write operation in the data being written to the slot. In other words, the sequence number may be included, by the application performing the sending/write operation, in the data written to the slot.

To obtain, by the respective applications (e.g., kernels), the local counter, and increment the local counter, the above-referenced locking and lock-free approaches may be used. For example, to use a lock-free design, in the method for the second entity, the acts of providing the value of the local counter and of incrementing the local counter may be performed together as a single atomic instruction. As outlined above, this single atomic instruction ensures that each application trying to send data to the first entity receives a different value for the local counter. As a result, in the method for the second entity, arbitration between different applications or different application threads may be performed using the single atomic instruction. For example, the local counter may be a full-size sequence number. The allowed range is the condition that send_ticket (i.e., the local counter)–peer_next_receive (i.e., the copy of the read indicator)<Ring Size. In fact, the arithmetic used is 32 bit or 64 bit, so a long running sequence of messages can eventually wrap around back to sequence number 0, but this is OK as long as the ring size is a power of two and "unsigned" arithmetic is used to compute ticket_number–peer_next_receive.

In the following, allocation is discussed. Ring buffer implementations often use write-pointers and read-pointers which increment, but in most implementations, these pointers (i.e., ring indices) are kept in a modulo-N form, where N is the number of ring entries. The same applies for non-circular, limited-size buffers, where N is the number of slots. When this is done, it becomes impossible to tell the difference between the ring being full and the ring being empty, so most implementations reserve a ring slot so that the ring can hold from 0 to N−1 messages but not N messages. This situation is illustrated in FIG. 3. It was recognized as early as 1993 (D. Becker Linux device driver for the Lance Ethernet) that instead, larger datatypes may be used to hold the read and write indices and mask them (modulo-N) only when accessing the ring. By subtracting the read index from the write index, the number of outstanding messages can be obtained, provided that the arithmetic involved wraps modulo a multiple of the size of the ring. This is straightforward to assure, by using unsigned arithmetic for the indices, and using a ring size that is a smaller power of 2. A second challenge with storing ring indices in modulo N form is that there is no standard modulo-N atomic increment instruction for general N, but there are standard modulo-$2^{32}$ or modulo-$2^{64}$ atomic increment instructions. By using ring indices larger than the ring size, arbitration for access can be implemented and a slot in sequence number space can be allocated with a single machine instruction. In the next section, the allocated sequence number is denoted as a "ticket".

In the following, waiting for ring space is discussed. When many threads send at once, more tickets for transmission may be granted than there are free slots in the ring, so the holder of a ticket must wait until the associated slot becomes available. In FIG. 8, allocated slots 840 are shown with a horizontal pattern. Threads are granted tickets for use of a slot. The tickets 840 are so are in the future that the sliding window of the ring buffer has not advanced far enough so that the slots associated with the tickets 840 are free for use (within the allowed range). Sending threads may wait until the ring window has advanced far enough so that the ticket sequence number is within the ring (as shown by region 830 showing in-progress messages). Updates occur when the receiver writes to the sender's Peer_next_receive.

Assuming the destination ring has N slots, threads which get tickets numbered N+i, 2N+i, 3N+i, and so forth will all use ring location (i.e., slot) i, so the holder of ticket 2N+i may wait at least until the message ticketed as N+i has been sent, received, and removed from the ring to make space for message 2N+i. (with i being a value in the range 0<=i<N.)

The sender master sequence number (e.g., the local counter at the second entity) may be the sequence number of the next message anyone will wish to send. This might only be known to the sender and be denoted "next_send" in FIG. 9. The receiver master sequence number is the sequence number of the next message expected to arrive. It may be known only to the receiver and is denoted "next_receive" in FIG. 9. The sender's copy of the receiver master sequence number (i.e., the copy of the read indicator) is the sequence number of the first message that the receiver has not acknowledged receiving. It is denoted "peer_next_receive" in FIG. 9. From the receiver's point of view, the ring is a sliding window that starts at next_receive and extends for N slots into the future. From the sender's point of view, the ring is a sliding window that starts at peer_next_receive and extends for N slots into the future (denoting the allowed range).

In the following, activity at the receiver is considered. The receiver is synchronized with the sender during initialization, and in the same way that the sending end has a master transmit sequence number (transmit ring index or next_send), the receiver has a master receive sequence number, which is the next message expected to arrive (next_receive).

If the receive sequence number happens to be N the receiver expects the next message to arrive in slot R (with R being N Module RingSize). Once message R has been dealt with, the receive sequence number will move on to R+1 and so forth. In most ring implementations, the sender and receiver both access the receive sequence number. The receiver needs it to know where the next message is expected, and the sender needs it to know how much space is left in the ring. However, shared access to a common memory location leads to poor performance. Instead, in the proposed concept, the receiver occasionally (i.e., according to the pre-defined criterion) sends a copy of the receive sequence number (i.e., the copy of the read indicator) to the sender. In FIG. 7, this is "peer_next_receive". For example, in a prototype implementation, an update was sent every 128 messages or so, which has several benefits: It is easy to decide when to update, by masking the receive sequence number. Moreover, the remote update is a write, which is fire and forget, so that the receiver can send the update and go on with receiving other messages. It uses very little bandwidth on the bus, roughly 1% of the data bandwidth. While the copy always lags behind the up-to-date version of the receive sequence number, which is the conservative direction. The sender's copy of the receive sequence number can be cached and accessed in shared fashion by all the transmit threads, rather than each sending thread needing to make a remote request to the receiver. Fewer updates reduces flow control bandwidth, but also means that sometimes ring capacity is not usable. For example, two may be considered the minimum possible. For example, 8 updates per ring cycle may be considered are appropriate. On balance, an update frequency about equal to the number of ring slots/8 was shown to provide adequate performance.

Back at the sending end, a thread holding ticket 2N+i is waiting until slot i ((2N+i) mod N) is free (i.e., the value of the local counter within the allowed range), so that the waiting message can be sent. This condition can be computed as If ((my_transmit_ticket−peer_next_receive)< Ring_Size) then free_to_transmit When the receiver is keeping up with the sender, then the ring will be nearly empty, and this test may succeed immediately, using a single local memory read, a single subtract, and a single compare. When the receiver is running behind, or a large burst of transmit activity allocates transmit tickets well into the future, it may be necessary to execute the test many times before it succeeds. Repeated testing is obviously more computation work, but the channel is backed up and performance is limited by communication bandwidth, not computation. Thus, the extra compute work is not detrimental to performance.

In FIG. 9 messages 950, 960 which are allocated, but which are waiting for space in the ring are shown with a horizontal pattern. The earliest such message 950 may actually be sendable, but the transmit threads do not know this yet because the receiver has not yet updated peer_next_receive.

In the following, transmitting the message is discussed. Each message may have data from the calling application, and also has overhead, in the form of the transmit sequence number (ticket number or slot number) and maybe other information such as the size. The purpose for the sequence number in the message is as a unique flag to let the receiver know a new message has arrived. In most ring buffer implementations, a receiver reads the master transmit index or sequence number to know a new message has been sent. This would be shared access to a remote memory location, which has a high performance cost. Instead, the receiver knows where (i.e., which slot) to expect the next message—in the next ring slot, but it might not know when the message will arrive. However, the receiver can tell when the message is delivered by the sequence number. The receiver may keep checking, or use MWAIT to sleep while waiting.

In some cases, a simple flag might be considered that would be set in the arriving message and would be cleared by the receiver to prepare for eventual reuse of the same ring slot. This is a suboptimal choice, because in most coherent memory systems, such as those on Intel® CPUs, a written location is placed into exclusive mode, and on a later write (by the next arriving message) the memory system would have to write back the ring location to memory and then invalidate the receivers' cache and only then provide a new value. Instead, by using the sequence number as the flag (i.e., by including the sequence number, or a shortened sequence number derived from the long-form sequence number, in the data), each message is uniquely distinguished from the previous message using the same slot, so the receiver may never have to write to the ring buffer, and instead can merely read it, which avoids write-backs and is generally faster.

In a prototype implementation, 32-bits were used for the sequence numbers, but this is not logically necessary. In essence, it suffices that each use of a ring slot be different than the previous use, and for that a single toggling bit is sufficient. In summary, each message requires a 1-bit overhead. In an alternative design, the sequence bit need not be collocated with the message, but having it be separate would require using at least two remote writes per message rather than one. For some transports, the payload message and ready message could be reordered, requiring additional ordering operations and costs. Combining sequence number and payload in a single message can avoid that overhead.

An additional benefit of having the "message has been delivered" signal be a flag in each message slot is that multiple sending threads can work in parallel. Due to hardware scheduling, the actual delivery of messages to the receiver may be out of sequential order, but this is acceptable. If the receiver wishes, it can check for arriving messages in sequential order, ignoring an early-arriving message N+1 until message N has been delivered. Permitting somewhat out of order message delivery helps with high performance because the sending threads do not have to coordinate to assure in order delivery.

Once the message is prepared, and the availability test has succeeded, the transmit thread can actually send the message, e.g., using a single machine instruction. In FIG. 7, messages 720 which have been sent but not yet received are indicated by a downward line pattern, and messages 730 which can be sent, but which have not yet been sent are indicated by empty boxes. Older messages 710 which have been received are shown with an upward line pattern. For example, some GPUs may support a 64-byte store instruction (which may or may not be an atomic instruction), which can be used to deliver a complete message in one instruction. On recent Intel CPUs, there is a similar 64-byte store instruction which deliver a message in one instruction.

FIG. 10 shows a pseudocode of an example of a GPU transmit subroutine. The line of code store64 generates a single GPU machine instruction. The comment "could be OOO" is to indicate that many threads may be executing the Send function at the same time (i.e., to write 245 the data to the limited-space data buffer) and may not be possible to say in what order the message delivery payloads will arrive at the receiver. A CPU version of the transmit subroutine may be implemented similarly, but may vary, for example with respect to specific fencing requirements or primitives used to read and write memory.

The GPU version of blocking message receive is similarly simple, and the CPU version is similar. FIG. 11 shows a pseudocode of an example of the GPU receive subroutine. In a manner discussed above, the receive code may also uses an atomic fetch and increment instruction to allocate ownership of a future receive message—a receive ticket, e.g., to perform receive arbitration and slot allocation.

In the following, the waiting for the message to arrive is discussed. As mentioned above, the receiver knows where a particular message is expected to arrive, but not when. For example, a receive thread might merely wait until the sequence number field in the ring slot becomes equal to the expected receive ticket value, next_receive. In the case of the GPU receive operation, the expected receive ticket value may be obtained by an atomic fetch and add of next_receive. Other threads may obtain different ticket values and be waiting for different messages. The CPU poll version, e.g., shown in FIGS. 15a and 15b, may not need to fetch and increment next_receive with an atomic instruction, as it uses locking. If the sequence number field is reduced (e.g., one bit), the receive thread waits for the low bit(s) of the field in the ring slot to match the low bit(s) of the receive ticket value.

In the following, the use of a single bit as a sequence number field is discussed, reducing the overhead (one bit per message). In the transmit code "Send", a transmit sequence number may be issued that is too far into the future to fit into the ring. The sending thread must wait until (sequence_number−next_receive)<RingSize before sending the message. There is an analogous issue for reception, in that a particular sequence will not be in the ring until (sequence_number−next_receive)<RingSize. This test is missing from the Receive code shown in FIG. 11, because, in the implementation shown in FIG. 11, the entire sequence number is included as part of the message, so there is no possibility that an old sequence number can be mistaken for a new one. This is not logically necessary. The sequence number in the message might only have enough bits so that a new message can be differentiated from the previous message. The minimum is one bit. As an example, if the ring size is 8 messages, and a full-size sequence number is 32 bits. A particular message may be assigned to ring entry sequence % 8. (Modulo 8). Thus, sequence number bits 0, 1, and 2 address the ring slot and will be the same for each successive use of the slot. The higher bits will be different on subsequent uses, and in particular bit 3 will be different. In this example, we will use bit 3 of the full sequence number as the sequence number sent as part of the message. Supposing a receive thread is waiting for the arrival of message 8, which will be in slot 0 of the ring. The previous use of slot 0 was for message 0, which has a 0 for bit 3. Message 8 has a 1 for bit three. The thread waiting for message 8 will wait until the sequence number bit is a 1 and conclude that is message 8. In more general terms, with respect to the methods of FIGS. 1a and 1b, the sequence number included in the data may be a shortened sequence number being re-used that may be derived from a long-form unique sequence number, e.g., from a range of bits of the sequence number.

If there are more receive threads than there are ring slots, it may occur that another thread is waiting for message 16, which will also be in slot 0. The thread waiting for message 16 may see the sequence bit 0 and think it is message 16, but actually it is still message 0. To fix this, the additional wait loop mentioned above may be added. The receive thread may obtain a sequence number (full size), and then wait until (sequence_number−next_receive)<RingSize, and then it will be safe to check the reduced number of bits kept in the message.

In some examples, a CPU thread can wait in a low power state using MONITOR/MWAIT instructions. Intel® processors have instructions called MONITOR and MWAIT. These permit software to MONITOR a memory address and then MWAIT for it to change. The waiting happens in a low-power state. For example, in the method for the first entity, the act of processing the data may comprise monitoring at least one slot of the plurality of slots for a change using a memory monitoring instruction, such as MONITOR/MWAIT. This facility can be used to wait for messages arriving in the ring.

In the following, an implementation of returning flow control information to the sender is shown (i.e., the copy of the read indicator), for an example where the flow control information is sent every 128 messages. As the copy of the read indicator has an effect on the allowed range, in the method for the second entity, the allowed range acts as a flow control for writing data to the limited-space data buffer. For example, a receive thread may load a message into a local variable, thus removing it from the ring. Then, in this version, the code may check to see if the low 7 bits of the received sequence number are equal to 0, which happens once every 128 messages. If so, the receive sequence number is sent as a remote store back to the sender (In FIG. 11 using the GPU_STORE_PEER_NEXT_RECV macro). This generates a single machine instruction. This test is equally efficient for any power of two messages between flow control updates. In general, the return of flow control information to the sender is not on any performance critical path in the software. It may not matter how aggressively flow control information is updated. In the version of Receive shown in FIG. 11, it is technically possible, with low probability, for peer_next_receive updates to occur out of order. This cannot cause a failure unless there are more receive threads than ring slots.

In the following, processing of the received messages is discussed. The receive thread may act on the received message according to logic in the ProcessMessage( ) function (shown in FIG. 11). In general, there is no limitation of how the message/data is processed. For example, if the limited-space data structure is used for communication, processing the data may comprise forwarding the data to an intended recipient (application/thread). This is a local operation and does not affect the ring. However, the receive processing cost affects when the thread can next perform a Receive( ). For example, multiple receive threads may be used so the receive rate is not limited by the ProcessMessage( ) cost.

Accordingly, in the method for the first entity, the act of processing the data may be performed by a single worker thread or by a plurality of worker threads (i.e., using multithreading). For example, the single worker thread may determine 132 the slot comprising the data to be processed based on the next expected sequence number. In this case, the read indicator can be incremented once the single thread has processed (or at least copied away) the data stored in the slot. In other words, the read indicator may be updated after the single worker thread has read or copied the data stored in the respective slot while processing the data.

In the case of a plurality of worker threads, i.e., multi-threading, the plurality of worker threads may each be assigned a sequence number, and the respective worker threads may determine 132 the slot comprising the data to be processed based on the respective sequence number. However, in this case, updating the read indicator is more complex, as the threads may be processed out of order. It may be ensured that the read indicator (e.g., the highest sequence number having been processed) is updated after all lower sequence numbers have been processed. In other words, the read indicator may be updated according to a highest sequence number of an uninterrupted sequence of sequence numbers having been read or copied by the plurality of worker threads. Below, an example is given on how this can be achieved in a highly-optimized multithreading implementation with tracks and groups.

In the following, an application of multithreading is discussed. As mentioned earlier, GPUs use a great many threads running in lockstep groups to execute kernels. Any or all of these threads may choose to send messages, so, in some examples, the design is lock-free and reduces inter-thread coordination to a single fetch-and-increment atomic instruction. A highly multithreaded GPU blocking receive can be implemented with even fewer lines of code, as shown in FIG. 11. CPUs have fewer threads, but each thread is faster. The CPU may use the same code for Transmit/Send, although using an x86 MOVDIR64 rather than a graphics instruction for the remote store.

CPU receive code can also be the same, but a blocking receive may be considered somewhat undesirable because if no messages arrive, the thread is stuck waiting indefinitely. Instead, it may be desirable to have a polling function, which receives a message if one is available, but which returns if there are no messages waiting. Since CPU threads are fast, this can be done with spin locks and a short critical section, as shown in FIG. 12 in the CPURing::Poll( ) subroutine. FIG. 12 shows a pseudocode of an example of a (locking) CPU receive polling subroutine.

In the version of Poll( ) shown in FIG. 12, an arriving thread attempts to lock the receive critical section with an atomic exchange. If it fails, some other thread is already working, so the arriving thread just returns. If the lock is successful, the thread loads the next expected message. If the sequence number is not as expected (the sequence number in the ring slot expected for the next_receive message is not equal to next_receive or a shorted version of it) the thread unlocks the critical section with an atomic store and returns. A thread may re-try the load several times, then time out and return. If the expected message has arrived, the thread updates the master receive sequence number. This does not have to be atomic, because the operation is already in a critical section. The thread updates the sender's copy of the master receive sequence number once every 128 packets ((next_receive & 0x7f)==0). Then the thread releases the lock and processes the received message.

On the GPU, a polling function with locking works, but its performance is low because GPU threads are slow and with locking there can only be one thread at a time in the critical section. This could be an acceptable design if CPU to GPU message rates are expected to be low.

Figure 13:
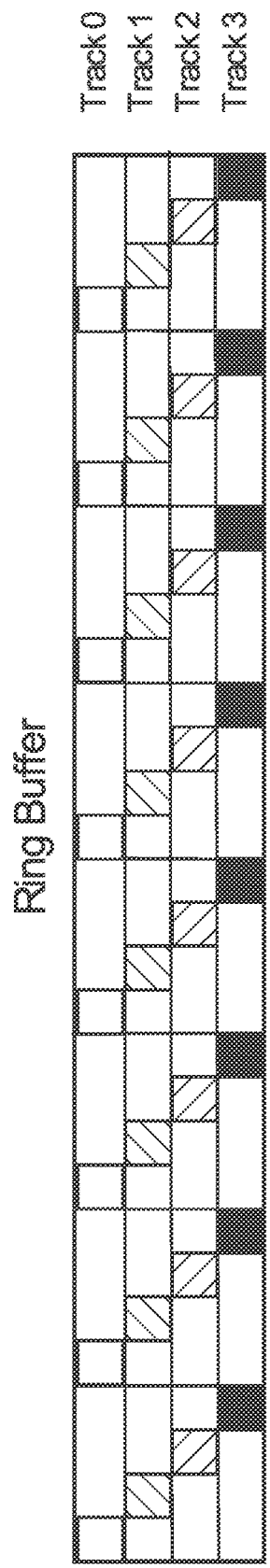
FIG. 13 shows a schematic diagram of a ring buffer being divided into tracks.

In some examples, many-thread receiving polling may be used. In the following, a high-performance multithreaded GPU polling function is presented, which is fairly complicated. The key insights are the following:

For example, tracks may be used. The receive ring may be divided into parallel tracks, so that a single track consists of or comprises all messages with the same residue, modulo the number of tracks. FIG. 13 shows a schematic diagram of a ring buffer being divided into four tracks. With 32 tracks, a given track is responsible for every $32^{nd}$ message. By using T tracks, T threads can simultaneously be busy receiving messages, multiplying performance by T. Within a track, we use locking and a critical section, so that a thread can either handle a message and return or find that there are none waiting and return. The next thread assigned to the same track will pick up where the previous thread left off. FIG. 13 shows a ring buffer configured for four tracks and 32 buffers. Every fourth buffer is in the same track.

To perform track assignment, a single instruction fetch and increment may be used to assign incoming threads to tracks in round robin order. If the assigned track is already in use, the new thread simply returns. This design decouples the number of active threads from the number of tracks. Individual tracks process received messages in order, but across all tracks, messages may be processed out of order. This may cause a problem in flow control, because the sender may not be informed that the ring is clear up to sequence number N if other threads are still busy processing earlier messages. Instead, a group credit mechanism may be used to return credits in-order to the sender even though receive messages are processed out of order.

Figure 14:
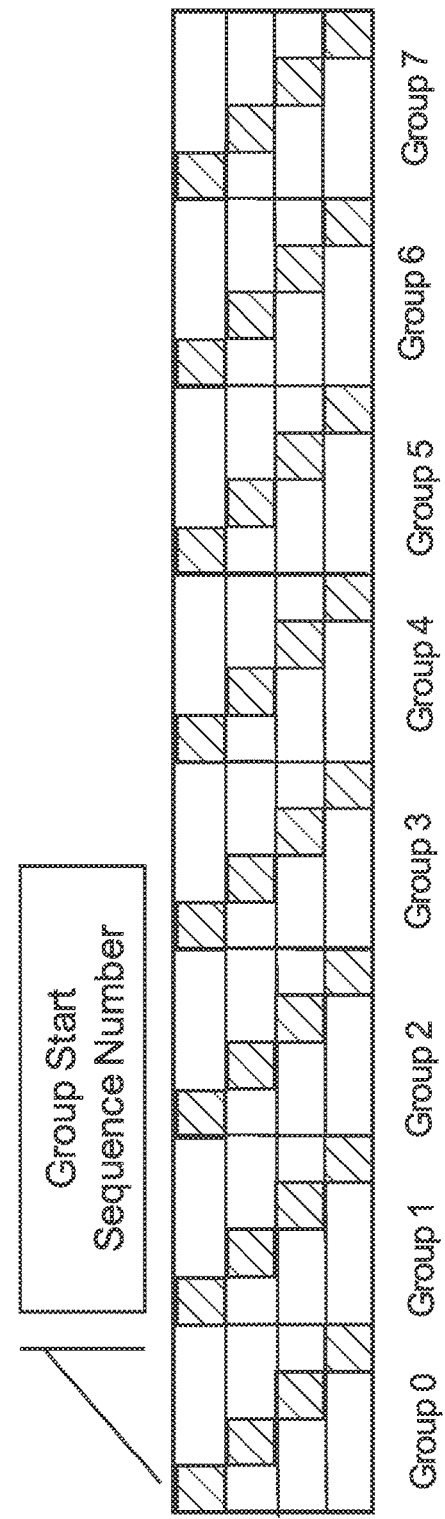
FIG. 14 shows a ring buffer divided into tracks and groups.

As shown in FIG. 14, the ring may be divided into a convenient number of groups, perhaps each containing 128 consecutive messages. The goal is to update the sender's copy of the master receive sequence number whenever a group is complete, and all previous groups are also complete. FIG. 14 shows a ring buffer divided into tracks and groups, and in particular 8 groups and 4 tracks.

To accomplish this, an atomic increment of a per-group counter may be used. As a thread finishes processing a message, it may increment the group counter corresponding to the message sequence number. When the value in the group counter reaches the group size, it means the group is finished, but a check may be included to determine whether the previous groups are also finished. To achieve that, the following can be done. A group may be considered complete when the group counter value is the sequence number of the first message in the next group. When this event occurs, the thread that did the final increment is responsible for updating the sender copy of the receive sequence number (which is just the group count!) and atomically adding the group count to the group counter for the following group. At system initialization, the first group counter may be initialized to the initial sequence number and other group counters may be initialized to zero. Each group may be considered complete when there is a carry-in of its initial count value plus individual increments for each message in the group. In more general terms, the act of processing the data may be performed by a plurality of worker threads, and the read indicator may be updated according to a highest sequence number of an uninterrupted sequence of sequence numbers having been read or copied by the plurality of worker threads. The uninterrupted sequence of sequence numbers may be determined using the above scheme, i.e., by incrementing the group counter of the following group. It is possible to have Poll( ) functions try several times for a message, or if one is found, try for another. Cache context is already loaded, and locks taken, so there is a locality benefit.

A multitrack poll is shown in FIG. 15a as GPURing:: PollMultiple( ). FIG. 15a shows a pseudocode of a GPU PollMultiple subroutine. FIG. 15b shows a pseudocode of an alternative implementation of the GPU PollMultiple subroutine.

In some examples, lock free multithreaded polling may be used. Multi-threaded receive polling can be done without locks, at the expense of additional complexity. One approach is to assign receive sequence numbers to threads as above, with atomic fetch-and-add. If the message turns out not to have arrived, the associated sequence number can be returned to a retry-queue using a (e.g., lock-free) local queue. Newly arrived threads may attempt a lock-free dequeue from the retry queue before assigning a new receive sequence number. In other words, in the method for the first entity, the act of processing the data may comprise adding 136 a sequence number of a (lock-free or locking) retry queue if data having the sequence number may be deemed late, and dequeuing 138 the sequence number from the (lock-free or locking) retry queue to retry processing the data. This approach avoids the needs for the track mechanism, but the group mechanism is still appropriate for returning credits to the sender in order.

In some examples, the OpenSHMEM (Open Shared Memory) communication library, and in particular the put_signal operation, may be used to send messages. The OpenSHMEM (Shared Memory) communications library provides for SIMD (Single Instruction Multiple Data) programs to run on a group of processes. SHMEM processing elements (Pes) can read and write memory on other Pes. The SHMEM put and get operations correspond to read and write, but they are not atomic. Basic SHMEM also includes atomic store operations. Basic SHMEM can be used to implement Ring communications over a network by using a shmem_put to store message data, then a shmem_fence, then a shmem_atomic_put to store the ring word containing the message sequence number. A recent update to SHMEM provides shmem_put_signal, which combines these three network operations into one, so a single SHMEM operation can send message data, provide a memory fence, and then store the triggering word containing the message sequence number.

Various examples of the proposed concept are based on using a bounded queue for message communication. This approach was shown to perform well in the presence of asymmetric memory access times. It may be implemented without the use of shared control variables, and with remote reference that are only stores (writes). Message transmission may be performed with a single instruction. Thread arbitration on send may be performed with a single instruction (highly concurrent), in a lock-free manner. Flow control may be performed using remote stores, with 1% resource usage (adjustable). A highly concurrent blocking read may be implemented (e.g., lock-free), or a medium concurrent non-blocking read (simple, but not lock free). A Track/Group design may be used for highly concurrent non-blocking read (not lock free). In summary, a high performance could be reached.

Various examples of the proposed concept provide a multi-reader, multi-writer ring buffer implementation suitable for environments permitting remote access to memory, but for which remote writes are favored over remote reads. In some examples, a single memory operation is used to send a complete message. Moreover, a low bus usage for flow control can be achieved. In some examples, remote operations may include only stores, and avoid or exclude loads. Moreover, lock-free operation of transmit may be provided, permitting very high degrees of parallelism, and/or lock-free operation of blocking receive may be provided, permitting high parallelism. For example, lock-free operation may be implemented using a counter with more bits than needed to represent the size of the ring buffer. In some examples, a multi-track, multi-group implementation for multi-threaded polling may be used for environments with many slow threads, such as GPU. Examples may provide in-order allocation, with possible slightly out of order transmit. Moreover, in-order receive, with slightly out of order processing may be performed. For example, out-of-order multithreaded polling may be used, with in-order credit return.

Note that the particular parameters chosen are mere examples.

In the following, some examples of the proposed concept are given:

An example (e.g., example 1) relates to a method for a first entity (100) for data buffering of write operations performed by a second entity (200), the method comprising providing (110) a limited-space data buffer comprising a plurality of slots for storing data provided by the second entity. The method comprises processing (130) the data stored in the slots of the limited-space data buffer. The method comprises updating (140) a read indicator based on the processing of the data. The method comprises providing (150) a copy of the read indicator to the second entity according to a pre-defined criterion.

Another example (e.g., example 2) relates to a previously described example (e.g., example 1) or to any of the examples described herein, further comprising that the data stored in the slots of the limited-space data buffer has a fixed size.

Another example (e.g., example 3) relates to a previously described example (e.g., one of the examples 1 to 2) or to any of the examples described herein, further comprising that the data stored in the slots of the limited-space data buffer comprises payload data.

Another example (e.g., example 4) relates to a previously described example (e.g., one of the examples 1 to 2) or to any of the examples described herein, further comprising that the data stored in the slots of the limited-space data buffer comprises a pointer to variable-size data provided by the second entity, wherein processing the data comprises obtaining the variable-size data according to the pointer stored in the respective slot.

Another example (e.g., example 5) relates to a previously described example (e.g., example 1) or to any of the examples described herein, further comprising that the data stored in the slots of the limited-space data buffer has a variable size, with the data comprising a header portion specifying a size of the data and a payload portion comprising payload data.

Another example (e.g., example 6) relates to a previously described example (e.g., one of the examples 1 to 4) or to any of the examples described herein, further comprising that the limited-space data buffer is a ring buffer.

Another example (e.g., example 7) relates to a previously described example (e.g., one of the examples 1 to 6) or to any of the examples described herein, further comprising that the limited-space data buffer is segmented into a first segment of previously processed data, a second segment of data being processed or data to be processed, and a third segment for future data to be provided by the second entity, with the segmentation changing according to a progress in processing the data and according to the copy of the read indicator provided to the second entity.

Another example (e.g., example 8) relates to a previously described example (e.g., one of the examples 1 to 7) or to any of the examples described herein, further comprising that the data stored in the respective slots comprises a sequence number, the method comprising determining (134) whether new data has been provided in a slot based on the sequence number of the data stored in the slot.

Another example (e.g., example 9) relates to a previously described example (e.g., example 8) or to any of the examples described herein, further comprising that the read indicator and the copy of the read indicator indicate one or more slots of the plurality of slots as having been processed in terms of the sequence numbers included in the respective data having been processed.

Another example (e.g., example 10) relates to a previously described example (e.g., example 9) or to any of the examples described herein, further comprising that the method comprises maintaining (120) at least one next expected sequence number, wherein the acts of determining whether new data has been provided in a slot and of processing the data are based on the at least one next expected sequence number.

Another example (e.g., example 11) relates to a previously described example (e.g., example 10) or to any of the examples described herein, further comprising that the acts of determining whether new data has been provided in a slot and of processing the data are based on a mapping between the respective sequence numbers and the plurality of slots.

Another example (e.g., example 12) relates to a previously described example (e.g., one of the examples 10 to 11) or to any of the examples described herein, further comprising that the act of processing the data is performed by a single worker thread, with the single worker thread determining (132) the slot comprising the data to be processed based on the next expected sequence number.

Another example (e.g., example 13) relates to a previously described example (e.g., one of the examples 10 to 11) or to any of the examples described herein, further comprising that the act of processing the data is performed by a plurality of worker threads, with the plurality of worker threads each being assigned a sequence number, and the respective worker threads determining (132) the slot comprising the data to be processed based on the respective sequence number.

Another example (e.g., example 14) relates to a previously described example (e.g., one of the examples 12 to 13) or to any of the examples described herein, further comprising that the act of processing the data comprises adding (136) a sequence number of a retry queue if data having the sequence number is deemed late, and dequeuing (138) the sequence number from the retry queue to retry processing the data.

Another example (e.g., example 15) relates to a previously described example (e.g., one of the examples 8 to 14) or to any of the examples described herein, further comprising that the sequence number included in the data is a shortened sequence number being re-used that is derived from a long-form unique sequence number.

Another example (e.g., example 16) relates to a previously described example (e.g., one of the examples 1 to 15) or to any of the examples described herein, further comprising that the act of processing the data is performed by a single worker thread, and the read indicator is updated after the single worker thread has read or copied the data stored in the respective slot while processing the data.

Another example (e.g., example 17) relates to a previously described example (e.g., one of the examples 1 to 16) or to any of the examples described herein, further comprising that the act of processing the data is performed by a plurality of worker threads, and the read indicator is updated according to a highest sequence number of an uninterrupted sequence of sequence numbers having been read or copied by the plurality of worker threads.

Another example (e.g., example 18) relates to a previously described example (e.g., one of the examples 1 to 17) or to any of the examples described herein, further comprising that the act of processing the data comprises monitoring at least one slot of the plurality of slots for a change using a memory monitoring instruction.

An example (e.g., example 19) relates to a method for a second entity for performing write operations at a first entity, the method comprising maintaining (210) a copy of a read indicator provided by the first entity as a local variable, the copy of the read indicator indicating one or more slots of a plurality of slots of a limited-space data buffer having been processed at the first entity. The method comprises setting (220) an allowed range for a local counter based on the read indicator. The method comprises providing (230) a value of the local counter to an application waiting to perform a write operation at a first entity, the value of the local counter indicating a slot of the plurality of slots to perform the write operation at, with the write operation being constrained by the allowed range. The method comprises incrementing (250) the local counter.

Another example (e.g., example 20) relates to a previously described example (e.g., example 19) or to any of the examples described herein, further comprising that the local counter represents a sequence number to be included by the application waiting to perform the write operation in the data being written to the slot, wherein the copy of the read indicator indicate the one or more slots of the plurality of slots having been processed in terms of sequence numbers included in the respective data having been processed by the first entity.

Another example (e.g., example 21) relates to a previously described example (e.g., one of the examples 19 to 20) or to any of the examples described herein, further comprising that the acts of providing the value of the local counter and of incrementing the local counter are performed together as a single atomic instruction.

Another example (e.g., example 22) relates to a previously described example (e.g., example 21) or to any of the examples described herein, further comprising that arbitration between different applications or different application threads is performed using the single atomic instruction.

Another example (e.g., example 23) relates to a previously described example (e.g., one of the examples 19 to 22) or to any of the examples described herein, further comprising that the limitation of the local counter to the allowed range acts as a flow control for writing data to the limited-space data buffer.

Another example (e.g., example 24) relates to a previously described example (e.g., one of the examples 19 to 23) or to any of the examples described herein, further comprising that the method further comprises, by the application, writing data (245) to a slot of the plurality of slots using an atomic write operation according to the local counter.

Another example (e.g., example 25) relates to a previously described example (e.g., one of the examples 19 to 24) or to any of the examples described herein, further comprising that the data stored in the slots of the limited-space data buffer comprises a pointer to variable-size data provided by the second entity, wherein processing the data comprises obtaining the variable-size data according to the pointer stored in the respective slot.

Another example (e.g., example 26) relates to a previously described example (e.g., one of the examples 19 to 24) or to any of the examples described herein, further comprising that the data stored in the slots of the limited-space data buffer has a variable size, with the data comprising a header portion specifying a size of the data and a payload portion comprising payload data.

An example (e.g., example 27) relates to an apparatus (10) for a first entity (12) for data buffering of write operations performed by a second entity (200), the apparatus comprising interface circuitry (12) for communicating with the second entity. The apparatus (10) comprises machine-readable instructions (16*a*). The apparatus (10) comprises processor circuitry (14) to execute the machine-readable instructions to perform the method according to one of the examples 1 to 18 comprises processor circuitry (24) to execute the machine-readable instructions.

An example (e.g., example 28) relates to an apparatus (20) for a second entity (200) for performing write operations at a first entity (100), the apparatus comprising interface circuitry (22) for communicating with the first entity. The apparatus (20) comprises machine-readable instructions (26*a*). The apparatus (20) comprises processor circuitry (24) to execute the machine-readable instructions to perform the method according to one of the examples 19 to 26 comprises processor circuitry (24) to execute the machine-readable instructions.

An example (e.g., example 29) relates to an apparatus (10) for a first entity (100) for data buffering of write operations performed by a second entity (200), the apparatus comprising interface circuitry (12) for communicating with the second entity. The apparatus (10) comprises machine-readable instructions (16*a*). The apparatus (10) comprises processor circuitry (14) to execute the machine-readable instructions to provide a limited-space data buffer comprising a plurality of slots for storing data provided by the second entity, process the data stored in the slots of the limited-space data buffer, update a read indicator based on the processing of the data, and provide a copy of the read indicator to the second entity according to a pre-defined criterion.

An example (e.g., example 30) relates to an apparatus (20) for a second entity (200) for performing write operations at a first entity (200), the apparatus comprising interface circuitry (22) for communicating with the first entity. The apparatus (20) comprises machine-readable instructions (26*a*). The apparatus (20) comprises processor circuitry (24) to execute the machine-readable instructions to maintain a copy of a read indicator provided by the first entity as a local variable, the copy of the read indicator indicating one or more slots of a plurality of slots of a limited-space data buffer having been processed at the first entity, set an allowed range for a local counter based on the read indicator. The comprises processor circuitry (24) is to execute the machine-readable instructions to provide a value of the local counter to an application waiting to perform a write operation at a first entity, the value of the local counter indicating a slot of the plurality of slots to perform the write operation at, with the write operation being constrained by the allowed range, and increment the local counter.

An example (e.g., example 31) relates to a device (10) for a first entity (100) for data buffering of write operations performed by a second entity (100), the device comprising means for communicating (12) with the second entity. The device (10) comprises means for processing (14) for providing a limited-space data buffer comprising a plurality of slots for storing data provided by the second entity, processing the data stored in the slots of the limited-space data buffer, updating a read indicator based on the processing of the data, and providing a copy of the read indicator to the second entity according to a pre-defined criterion.

An example (e.g., example 32) relates to a device (20) for a second entity (200) for performing write operations at a first entity (100), the device comprising means for communicating (22) with the first entity. The device (20) comprises means for processing (24) for maintaining a copy of a read indicator provided by the first entity as a local variable, the copy of the read indicator indicating one or more slots of a plurality of slots of a limited-space data buffer having been processed at the first entity, setting an allowed range for a local counter based on the read indicator. The means for processing is for providing a value of the local counter to an application waiting to perform a write operation at a first entity, the value of the local counter indicating a slot of the plurality of slots to perform the write operation at, with the write operation being constrained by the allowed range, and incrementing the local counter.

An example (e.g., example 33) relates to a system comprising the apparatus (10) according to one of the examples 27 and 29 (or according to any other example) and the apparatus (20) according to one of the examples 28 and 30 (or according to any other example).

An example (e.g., example 34) relates to a system comprising the device (10) according to example 31 (or according to any other example) and the device (20) according to example 32 (or according to any other example).

An example (e.g., example 35) relates to a non-transitory machine-readable storage medium including program code, when executed, to cause a machine to perform the method of one of the examples 1 to 18 (or according to any other example) or the method according to one of the examples 19 to 26 (or according to any other example).

An example (e.g., example 36) relates to a computer program having a program code for performing the method of one of the examples 1 to 18 (or according to any other example) or the method according to one of the examples 19 to 26 (or according to any other example) when the computer program is executed on a computer, a processor, or a programmable hardware component. An example (e.g., example 37) relates to a machine-readable storage including machine readable instructions, when executed, to implement a method or realize an apparatus as shown in any example or claimed in any pending claim.

The aspects and features described in relation to a particular one of the previous examples may also be combined with one or more of the further examples to replace an identical or similar feature of that further example or to additionally introduce the features into the further example.

Examples may further be or relate to a (computer) program including a program code to execute one or more of the above methods when the program is executed on a computer, processor, or other programmable hardware component. Thus, steps, operations, or processes of different ones of the methods described above may also be executed by programmed computers, processors or other programmable hardware components. Examples may also cover program storage devices, such as digital data storage media, which are machine-, processor- or computer-readable and encode and/or contain machine-executable, processor-executable or computer-executable programs and instructions. Program storage devices may include or be digital storage devices, magnetic storage media such as magnetic disks and magnetic tapes, hard disk drives, or optically readable digital data storage media, for example. Other examples may also include computers, processors, control units, (field) programmable logic arrays ((F)PLAs), (field) programmable gate arrays ((F)PGAs), graphics processor units (GPU), application-specific integrated circuits (ASICs), integrated circuits (ICs) or system-on-a-chip (SoCs) systems programmed to execute the steps of the methods described above.

It is further understood that the disclosure of several steps, processes, operations, or functions disclosed in the description or claims shall not be construed to imply that these operations are necessarily dependent on the order described, unless explicitly stated in the individual case or necessary for technical reasons. Therefore, the previous description does not limit the execution of several steps or functions to a certain order. Furthermore, in further examples, a single step, function, process, or operation may include and/or be broken up into several sub-steps, -functions, -processes or -operations.

If some aspects have been described in relation to a device or system, these aspects should also be understood as a description of the corresponding method. For example, a block, device or functional aspect of the device or system may correspond to a feature, such as a method step, of the corresponding method. Accordingly, aspects described in relation to a method shall also be understood as a description of a corresponding block, a corresponding element, a property or a functional feature of a corresponding device or a corresponding system.

As used herein, the term "module" refers to logic that may be implemented in a hardware component or device, software or firmware running on a processing unit, or a combination thereof, to perform one or more operations consistent with the present disclosure. Software and firmware may be embodied as instructions and/or data stored on non-transitory computer-readable storage media. As used herein, the term "circuitry" can comprise, singly or in any combination, non-programmable (hardwired) circuitry, programmable circuitry such as processing units, state machine circuitry, and/or firmware that stores instructions executable by programmable circuitry. Modules described herein may, collectively or individually, be embodied as circuitry that forms a part of a computing system. Thus, any of the modules can be implemented as circuitry. A computing system referred to as being programmed to perform a method can be programmed to perform the method via software, hardware, firmware, or combinations thereof.

Any of the disclosed methods (or a portion thereof) can be implemented as computer-executable instructions or a computer program product. Such instructions can cause a computing system or one or more processing units capable of executing computer-executable instructions to perform any of the disclosed methods. As used herein, the term "computer" refers to any computing system or device described or mentioned herein. Thus, the term "computer-executable instruction" refers to instructions that can be executed by any computing system or device described or mentioned herein.

The computer-executable instructions can be part of, for example, an operating system of the computing system, an application stored locally to the computing system, or a remote application accessible to the computing system (e.g., via a web browser). Any of the methods described herein can be performed by computer-executable instructions performed by a single computing system or by one or more networked computing systems operating in a network environment. Computer-executable instructions and updates to the computer-executable instructions can be downloaded to a computing system from a remote server.

Further, it is to be understood that implementation of the disclosed technologies is not limited to any specific computer language or program. For instance, the disclosed technologies can be implemented by software written in C++, C#, Java, Perl, Python, JavaScript, Adobe Flash, C#, assembly language, or any other programming language. Likewise, the disclosed technologies are not limited to any particular computer system or type of hardware.

Furthermore, any of the software-based examples (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, cable (including fiber optic cable), magnetic communications, electromagnetic communications (including RF, microwave, ultrasonic, and infrared communications), electronic communications, or other such communication means.

The disclosed methods, apparatuses, and systems are not to be construed as limiting in any way. Instead, the present disclosure is directed toward all novel and nonobvious features and aspects of the various disclosed examples, alone and in various combinations and subcombinations with one another. The disclosed methods, apparatuses, and systems are not limited to any specific aspect or feature or combination thereof, nor do the disclosed examples require that any one or more specific advantages be present, or problems be solved.

Theories of operation, scientific principles, or other theoretical descriptions presented herein in reference to the apparatuses or methods of this disclosure have been provided for the purposes of better understanding and are not intended to be limiting in scope. The apparatuses and methods in the appended claims are not limited to those apparatuses and methods that function in the manner described by such theories of operation.

The following claims are hereby incorporated in the detailed description, wherein each claim may stand on its own as a separate example. It should also be noted that although in the claims a dependent claim refers to a particular combination with one or more other claims, other examples may also include a combination of the dependent claim with the subject matter of any other dependent or independent claim. Such combinations are hereby explicitly proposed, unless it is stated in the individual case that a particular combination is not intended. Furthermore, features of a claim should also be included for any other independent claim, even if that claim is not directly defined as dependent on that other independent claim.

What is claimed is:

1. A method for a first entity for data buffering of write operations performed by a second entity, the method comprising:
   providing a limited-space data buffer comprising a plurality of slots for storing data provided by the second entity;
   processing the data stored in the slots of the limited-space data buffer;
   updating a read indicator based on the processing of the data; and
   providing a copy of the read indicator to the second entity according to a pre-defined criterion.

2. The method according to claim 1, wherein the data stored in the slots of the limited-space data buffer has a fixed size.

3. The method according to claim 1, wherein the data stored in the slots of the limited-space data buffer has a variable size, with the data comprising a header portion specifying a size of the data and a payload portion comprising payload data.

4. The method according to claim 1, wherein the limited-space data buffer is segmented into a first segment of previously processed data, a second segment of data being processed or data to be processed, and a third segment for future data to be provided by the second entity, with the segmentation changing according to a progress in processing the data and according to the copy of the read indicator provided to the second entity.

5. The method according to claim 1, wherein the data stored in the respective slots comprises a sequence number, the method comprising determining whether new data has been provided in a slot based on the sequence number of the data stored in the slot.

6. The method according to claim 5, wherein the read indicator and the copy of the read indicator indicate one or more slots of the plurality of slots as having been processed in terms of the sequence numbers included in the respective data having been processed, the method comprising maintaining at least one next expected sequence number, wherein the acts of determining whether new data has been provided in a slot and of processing the data are based on the at least one next expected sequence number.

7. The method according to claim 6, wherein the acts of determining whether new data has been provided in a slot and of processing the data are based on a mapping between the respective sequence numbers and the plurality of slots.

8. The method according to claim 6, wherein the act of processing the data is performed by a single worker thread, with the single worker thread determining the slot comprising the data to be processed based on the next expected sequence number.

9. The method according to claim 6, wherein the act of processing the data is performed by a plurality of worker threads, with the plurality of worker threads each being assigned a sequence number, and the respective worker threads determining the slot comprising the data to be processed based on the respective sequence number.

10. The method according to claim 5, wherein the sequence number included in the data is a shortened sequence number being re-used that is derived from a long-form unique sequence number.

11. The method according to claim 1, wherein the act of processing the data is performed by a single worker thread, and the read indicator is updated after the single worker thread has read or copied the data stored in the respective slot while processing the data.

12. The method according to claim 1, wherein the act of processing the data is performed by a plurality of worker threads, and the read indicator is updated according to a highest sequence number of an uninterrupted sequence of sequence numbers having been read or copied by the plurality of worker threads.

13. A method for a second entity for performing write operations at a first entity, the method comprising:
   maintaining a copy of a read indicator provided by the first entity as a local variable, the copy of the read indicator indicating one or more slots of a plurality of slots of a limited-space data buffer having been processed at the first entity;
   setting an allowed range for a local counter based on the read indicator;
   providing a value of the local counter to an application waiting to perform a write operation at a first entity, the value of the local counter indicating a slot of the plurality of slots to perform the write operation at, with the write operation being constrained by the allowed range; and
   incrementing the local counter.

14. The method according to claim 13, wherein the local counter represents a sequence number to be included by the application waiting to perform the write operation in the data being written to the slot, wherein the copy of the read indicator indicate the one or more slots of the plurality of slots having been processed in terms of sequence numbers included in the respective data having been processed by the first entity.

15. The method according to claim 13, wherein the acts of providing the value of the local counter and of incrementing the local counter are performed together as a single atomic instruction.

16. The method according to claim 13, wherein the method further comprises, by the application, writing data to a slot of the plurality of slots using an atomic write operation according to the local counter.

17. An apparatus for a first entity for data buffering of write operations performed by a second entity, the apparatus comprising:
   interface circuitry for communicating with the second entity; and
   machine-readable instructions; and
   processor circuitry to execute the machine-readable instructions to perform the method according to claim 1.

18. An apparatus for a second entity for performing write operations at a first entity, the apparatus comprising:
   interface circuitry for communicating with the first entity; and
   machine-readable instructions; and
   processor circuitry to execute the machine-readable instructions to perform the method according to claim 13.

19. A non-transitory machine-readable storage medium including program code, when executed, to cause a machine to perform the method of claim 1.

20. A non-transitory machine-readable storage medium including program code, when executed, to cause a machine to perform the method according to claim 13.

* * * * *